(12) United States Patent
You et al.

(10) Patent No.: US 8,188,982 B2
(45) Date of Patent: May 29, 2012

(54) TOUCH SCREEN DISPLAY APPARATUS AND METHOD OF MANUFACTURING THE SAME

(75) Inventors: Doo-Hwan You, Gwangmeung-si (KR); Young-Je Cho, Cheonan-si (KR); In-Ho Park, Cheonan-si (KR); Sang-Heon Song, Cheonan-si (KR)

(73) Assignee: Samsung Electronics Co., Ltd. (KR)

( * ) Notice: Subject to any disclaimer, the term of this patent is extended or adjusted under 35 U.S.C. 154(b) by 588 days.

(21) Appl. No.: 12/466,686

(22) Filed: May 15, 2009

(65) Prior Publication Data

US 2010/0134429 A1 Jun. 3, 2010

(30) Foreign Application Priority Data

Dec. 1, 2008 (KR) ........................ 10-2008-0120517

(51) Int. Cl.
*G06F 3/041* (2006.01)
*G06F 3/033* (2006.01)
*G02F 1/133* (2006.01)
(52) U.S. Cl. ........... 345/173; 345/104; 345/204; 349/38
(58) Field of Classification Search ................. 345/104, 345/173, 204; 349/38
See application file for complete search history.

(56) References Cited

U.S. PATENT DOCUMENTS

| | | | | |
|---|---|---|---|---|
| 4,031,529 A | * | 6/1977 | Borel et al. | 345/101 |
| 7,170,576 B2 | * | 1/2007 | Jun et al. | 349/155 |
| 2004/0227743 A1 | * | 11/2004 | Brown | 345/204 |
| 2005/0264535 A1 | * | 12/2005 | Johnson et al. | 345/173 |
| 2007/0283832 A1 | * | 12/2007 | Hotelling | 101/487 |
| 2008/0048995 A1 | * | 2/2008 | Abileah et al. | 345/173 |
| 2008/0074401 A1 | * | 3/2008 | Chung et al. | 345/175 |
| 2008/0218489 A1 | * | 9/2008 | Park et al. | 345/173 |
| 2008/0284929 A1 | * | 11/2008 | Kimura | 349/38 |

FOREIGN PATENT DOCUMENTS

| | | | |
|---|---|---|---|
| GB | 2 439 098 A | * | 12/2007 |
| JP | 2007052368 A | | 3/2007 |
| JP | 2007226217 A | | 9/2007 |
| KR | 1020010026674 A | | 4/2001 |
| KR | 1020080020306 A | | 3/2008 |

* cited by examiner

*Primary Examiner* — Quan-Zhen Wang
*Assistant Examiner* — Michael J Eurice
(74) *Attorney, Agent, or Firm* — Cantor Colburn LLP

(57) ABSTRACT

A touch screen display apparatus includes a first substrate including a pixel electrode and a lower sensor electrode, a second substrate facing the first substrate and including a common electrode and an upper sensor electrode facing the lower sensor electrode, a liquid crystal layer interposed between the substrates, a first alignment layer disposed on the pixel electrode and the common electrode, a second alignment layer disposed on the lower sensor electrode, and a third alignment layer disposed on the upper sensor electrode. The second or third alignment layers aligns the liquid crystal layer in a different direction from a direction the first alignment layer aligns the liquid crystal layer. When pressure is applied onto a point on the first or second substrate, a distance and a capacitance between the lower sensor electrode and the upper sensor electrode at the point are changed to detect a position of the point.

20 Claims, 12 Drawing Sheets

TOUCH SCREEN DISPLAY APPARATUS AND METHOD OF MANUFACTURING THE SAME

This application claims priority to Korean Patent Application No. 10-2008-0120517 filed on Dec. 1, 2008, and all the benefits accruing therefrom under 35 U.S.C. §119, the disclosure of which is incorporated herein by reference in its entirety.

BACKGROUND OF THE INVENTION

1. Field of the Invention

The present invention relates to a display apparatus and a method of manufacturing the same, and more particularly, to a touch screen display apparatus and a method of manufacturing the same.

2. Description of the Related Art

Touch screen display apparatuses are input apparatuses that can replace keyboards and mice. To perform a desired task using a touch screen display apparatus, users may touch a touch screen, which is implemented on a liquid crystal panel, by using various instruments, such as a hand or a pen. Thus, touch screen display apparatuses are advantageous apparatuses which enable users to perform an intuitive task in a graphic user interface ("GUI") environment. Touch screen display apparatuses can be used extensively in the fields of application of computer-based training and simulation, office automation, education, games, and the like.

A touch screen display apparatus includes a liquid crystal panel which displays image information, a separate touch panel which is additively attached to the liquid crystal panel, a controller, a device driver and application software.

The liquid crystal panel includes a common electrode display panel including a common electrode and a thin-film transistor ("TFT") display panel including a TFT array. The common electrode display panel and the TFT display panel face each other, and are joined with each other by a seal line which is interposed between them. In addition, a liquid crystal layer is disposed in a gap between the common electrode display panel and the TFT display panel.

As described above, the liquid crystal panel includes two display panels (e.g., the common electrode display panel and the TFT display panel) including electrodes and the liquid crystal layer inserted between the two display panels. The liquid crystal panel is designed to display images by applying a voltage to the electrodes to rearrange liquid crystal molecules of the liquid crystal layer, and thus adjust the amount of light that passes through the liquid crystal layer.

Since the liquid crystal panel is a non-light-emitting device, a backlight unit, which provides light, is disposed behind the TFT display panel. When light emitted from the backlight unit passes through the liquid crystal layer, the transmittance of the light is determined by the arrangement of liquid crystal molecules.

The separate touch panel additionally includes two substrates which face each other, upper and lower conductive layers which are disposed on the two substrates, respectively, and a plurality of auxiliary spacers which are interposed between the upper and lower conductive layers. When a user presses a point on the touch panel by using the hand or the pen, the upper conductive layer and the lower conductive layer contact each other at the point and thus are electrically connected to each other. Accordingly, the location information of the point is detected.

Conventional touch screen display apparatuses structured as described above are used as a component of, in particular, personal digital assistants ("PDAs") and mobile communication devices (e.g., mobile phones).

BRIEF SUMMARY OF THE INVENTION

Since a touch screen display apparatuses requires a touch panel to detect location information, there may be disadvantages to attaching a separate touch panel including two substrates, to a liquid crystal panel including two display panels. For example, where the touch panel is disposed on (e.g., overlapping) the liquid crystal panel of the touch screen display apparatus, an overall thickness of the touch screen display apparatus undesirably increases. Where the separate touch panel is disposed adjacent to the liquid crystal panel of the touch screen apparatus, a dimension (e.g., plan view length or width) undesirably increases. Where a size of the combined touch screen display apparatus including the separate touch panel increases, the resulting touch screen display apparatus becomes relatively big and prohibitive for users to transport. In this regard, it is required to develop a touch screen display apparatus which is relatively light, thin, and small in overall dimension, and which can be easily manufactured.

Exemplary embodiments of the present invention provide a relatively light, thin, and overall small-dimensioned touch screen display apparatus, with improved sensing sensitivity.

Exemplary embodiments of the present invention also provide a method of manufacturing the above touch screen display apparatus.

In an exemplary embodiment of the present invention, there is provided a touch screen display apparatus including a first substrate, a pixel electrode and a lower sensor electrode which are formed on the first substrate, a second substrate which faces the first substrate, a common electrode which is formed on the second substrate and overlaps the pixel electrode, an upper sensor electrode which is formed on the second substrate and faces the lower sensor electrode, a liquid crystal layer which includes liquid crystal molecules interposed between the first substrate and the second substrate, a first alignment layer which is formed on the pixel electrode and the common electrode, a second alignment layer which is formed on the lower sensor electrode, and a third alignment layer which is formed on the upper sensor electrode. At least one of the second and third alignment layers aligns the liquid crystal molecules in a different direction from a direction in which the first alignment layer aligns the liquid crystal molecules. When pressure is applied onto a point on the first or second substrate, a distance between the lower sensor electrode and the upper sensor electrode at the point is changed. A position of the point is detected by using a change in capacitance between the lower sensor electrode and the upper sensor electrode according to the change in the distance between the lower sensor electrode and the upper sensor electrode.

In an exemplary embodiment of the present invention, there is provided a method of manufacturing a touch screen display apparatus. The method includes forming a first alignment layer and a second alignment layer on a pixel area and a sensor area of a first substrate, respectively, placing a second substrate to face the first substrate, and interposing a liquid crystal layer, which includes liquid crystal molecules, between the first substrate and the second substrate. The first alignment layer aligns the liquid crystal molecules in a different direction from a direction in which the second alignment layer aligns the liquid crystal molecules. When touch pressure is applied onto a point on the first or second substrate, a distance between the first and second substrates in the sensor area is changed and a position of the point is detected by using a change in capacitance of the liquid crystal molecules according to the change in the distance between the first and second substrates.

BRIEF DESCRIPTION OF THE DRAWINGS

The above and other aspects and features of the present invention will become more apparent by describing in detail exemplary embodiments thereof with reference to the attached drawings, in which.

DETAILED DESCRIPTION OF THE INVENTION

Figure 1:
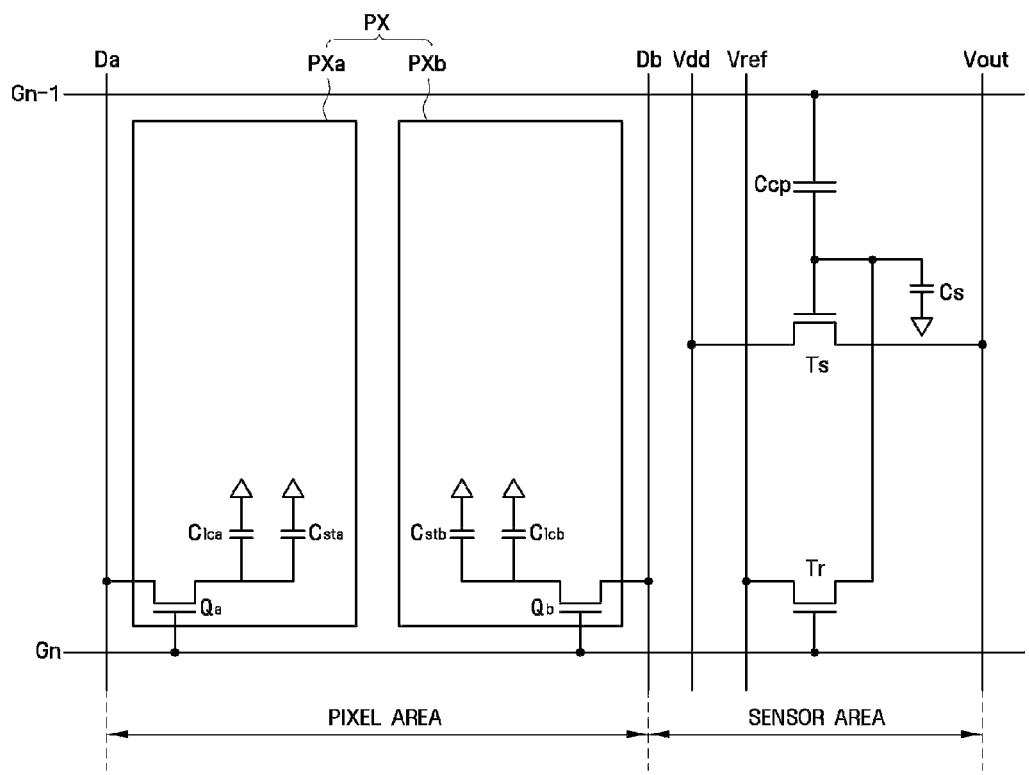
FIG. 1 is an equivalent circuit diagram of a pixel included in a touch screen display apparatus according to a first exemplary embodiment of the present invention.

Advantages and features of the present invention and methods of accomplishing the same may be understood more readily by reference to the following detailed description of exemplary embodiments and the accompanying drawings. The present invention may, however, be embodied in many different forms and should not be construed as being limited to the embodiments set forth herein. Rather, these embodiments are provided so that this disclosure will be thorough and complete and will fully convey the concept of the invention to those skilled in the art, and the present invention will only be defined by the appended claims. In some embodiments, well-known processing processes, well-known structures and well-known technologies will not be specifically described in order to avoid ambiguous interpretation of the present invention. Like reference numerals refer to like elements throughout the specification.

It will be understood that when an element or layer is referred to as being "on" another element or layer, the element or layer can be directly on another element or layer or intervening elements or layers. In contrast, when an element is referred to as being "directly on" another element or layer, there are no intervening elements or layers present. Like numbers refer to like elements throughout. As used herein, the term "and/or" includes any and all combinations of one or more of the associated listed items.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention.

Spatially relative terms, such as "lower," "under," "upper," and the like, may be used herein for ease of description to describe the relationship of one element or feature to another element(s) or feature(s) as illustrated in the figures. It will be understood that the spatially relative terms are intended to encompass different orientations of the device in use or operation, in addition to the orientation depicted in the figures. For example, if the device in the figures is turned over, elements described as "lower" or "under" other elements or components would then be oriented "above" the other elements or components. Thus, the exemplary term "lower" or "under" can encompass both an orientation of above and below. The device may be otherwise oriented and the spatially relative descriptors used herein interpreted accordingly.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments of the invention are described herein with reference to plan and cross-section illustrations that are schematic illustrations of idealized embodiments of the invention. As such, variations from the shapes of the illustrations as a result, for example, of manufacturing techniques and/or tolerances, are to be expected. Thus, embodiments of the invention should not be construed as limited to the particular shapes of regions illustrated herein but are to include deviations in shapes that result, for example, from manufacturing. Thus, the regions illustrated in the figures are schematic in nature and their shapes are not intended to illustrate the actual shape of a region of a device and are not intended to limit the scope of the invention.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

All methods described herein can be performed in a suitable order unless otherwise indicated herein or otherwise clearly contradicted by context. The use of any and all examples, or exemplary language (e.g., "such as"), is intended merely to better illustrate the invention and does not pose a limitation on the scope of the invention unless otherwise claimed. No language in the specification should be construed as indicating any non-claimed element as essential to the practice of the invention as used herein.

Hereinafter, a touch screen display apparatus according to exemplary embodiments of the present invention will be described in detail with reference to the attached drawings.

FIG. 1 is an equivalent circuit diagram of a pixel PX included in a touch screen display apparatus according to a first exemplary embodiment of the present invention.

The touch screen display apparatus according to the first exemplary embodiment includes a liquid crystal panel assembly, a gate driver and a data driver which are physically and electrically connected to the liquid crystal panel assembly, a gray voltage generator which is physically and electrically connected to the data driver, and a signal controller which controls the gate driver and the data driver.

The liquid crystal panel assembly is physically and electrically connected to a plurality of display signal lines and includes a plurality of pixels PX, which may be arranged substantially in a matrix. The liquid crystal panel assembly includes lower and upper display panels which face each other, and a liquid crystal layer 100 (see FIG. 9) which is interposed between the lower and upper display panels. In an exemplary embodiment, a pixel PX may be defined as an independent area unit capable of independently controlling the liquid crystal layer 100.

Referring to FIG. 1, the liquid crystal panel assembly is divided into a pixel area PIXEL AREA, in which images are displayed, and a sensor area SENSOR AREA in which a contact or touch is sensed. The PIXEL AREA and the SENSOR AREA are disposed directly adjacent to each other may not substantially overlap with each other. A pixel of the touch screen display apparatus may include both the PIXEL AREA and the SENSOR AREA.

Firstly, the pixel area PIXEL AREA will be described below.

The display signal lines are provided on the lower display panel of the liquid crystal panel assembly, and include a plurality of gate lines ($n^{th}$ and $(n-1)^{th}$ gate lines Gn and Gn-1 in FIG. 1), which deliver gate signals, and a plurality of data lines (data lines Da and Db in FIG. 1) which deliver data signals. The gate lines extend in a substantially (first) row direction and are substantially parallel to each other, and the data lines extend in a substantially (second) column direction and are substantially parallel to each other.

Each of the pixels PX includes a pair of subpixels. The pair of subpixels includes a first and a second subpixel PXa and PXb. The first subpixel PXa includes a first switching device Qa which is physically and electrically connected to the data line Da and the $n^{th}$ gate line Gn, a first liquid crystal capacitor Clca which is physically and electrically connected to the first switching device Qa, and a first storage capacitor Csta which is physically and electrically connected to the first switching device Qa. The second subpixel PXb includes a second switching device Qb which is physically and electrically connected to the data line Db and the $n^{th}$ gate line Gn, a second liquid crystal capacitor Clcb which is physically and electrically connected to the second switching device Qb, and a second storage capacitor Cstb which is physically and electrically connected to the second switching device Qb. In the illustrated embodiment, two data lines Da and Db and one gate line Gn are allocated to a pair of subpixels including the first and second subpixels PXa and PXb. In an alternative embodiment, the first and second storage capacitors Csta and Cstb may be omitted when necessary.

The first or second switching device Qa or Qb in each of the first and second subpixels PXa and PXb may be a thin-film transistor disposed on the lower display panel of the liquid crystal panel assembly. In the illustrated embodiment, each of the first and second switching devices Qa and Qb is a three-terminal device that includes a control terminal (hereinafter, referred to as a gate electrode) connected to the $n^{th}$ gate line Gn to which a gate signal is transmitted, an input terminal (hereinafter, referred to as a source electrode) connected to the data line Da or Db, and an output terminal (hereinafter, referred to as a drain electrode) connected to the first or second liquid crystal capacitor Clca or Clcb and the first or second storage capacitor Csta or Cstb.

Each of the first and second liquid crystal capacitors Clca and Clcb uses a first or second subpixel electrode 82a or 82b (see FIG. 2) of the lower display panel of the liquid crystal panel assembly, and a common electrode 330 (see FIG. 7) of the upper display panel of the liquid crystal panel assembly as its two terminals, respectively. The liquid crystal layer 100 interposed between each of the first and second subpixel electrodes 82a and 82b and the common electrode 330 functions as a dielectric. The first and second subpixel electrodes 82a and 82b are electrically connected to the first and second switching devices Qa and Qb, respectively. The common electrode 330 is disposed on substantially an entire surface of the upper display panel of the liquid crystal panel assembly and provided with a common voltage Vcom. The common electrode 330 may alternatively be disposed on the lower display panel of the liquid crystal panel assembly. In an exemplary embodiment, the first and second electrodes 82a and 82b and/or the common electrode 330 may be substantially linear or bar-shaped.

The first and second storage capacitors Csta and Cstb supplement the first and second liquid crystal capacitors Clca and Clcb, respectively. Each of the first and second storage capacitors Csta and Cstb includes storage wiring and the first or second subpixel electrode 82a or 82b, which are disposed on the lower display panel of the liquid crystal panel assembly and overlap each other with an insulator therebetween. A predetermined voltage, such as the common voltage Vcom, is applied to the storage wiring. In an exemplary embodiment, each of the first and second storage capacitors Csta and Cstb may also include the first or second subpixel electrode 82a or 82b and the $(n-1)^{th}$ gate line Gn-1 using the insulator as a medium.

Each pixel PX may display one of primary colors (e.g., spatial division) or may display the primary colors at different times (e.g., time division) so that the spatio-temporal sum of the primary colors is capable of producing a desired color which can be clearly defined and recognized. The primary colors may include red, green and blue. In one exemplary embodiment of spatial division, each pixel PX may include a color filter representing one of the primary colors in an area of the upper display panel of the liquid crystal panel assembly. In addition, the color filter may be disposed on or under the first and second subpixel electrodes 82a and 82b of the lower display panel of the liquid crystal panel assembly.

The gate driver (not shown) is connected to the $n^{th}$ and $(n-1)^{th}$ gate lines Gn and Gn−1, and transmits a gate signal (e.g., a gate-on voltage Von or a gate-off voltage Voff received from an external source), to each of the $n^{th}$ and $(n-1)^{th}$ gate lines Gn and Gn−1.

The gray voltage generator (not shown) may generate more than one, such as two, sets of gray voltages (or reference gray voltages) to be transmitted to the pixels PX and apply the generated two sets of gray voltages to the data driver (not shown). The two sets of gray voltages may be independently applied to each pair of subpixels (e.g., the first and second subpixels PXa and PXb) that form each pixel. However, the present invention is not limited thereto, and the gray voltage generator may generate only one set of gray voltages.

The data driver is connected to each of a pair of the data lines Da and Db. The data driver applies a first data voltage to the first subpixel PXa via the data line Da, and applies a second data voltage to the second subpixel PXb via the data line Db.

In an exemplary embodiment, the gate driver and/or the data driver may be mounted directly on the liquid crystal panel assembly in the form of a plurality of driving integrated circuit ("IC") chips. Alternatively, the gate driver or the data driver may be mounted on a flexible printed circuit film and then attached to the liquid crystal panel assembly in the form of a tape carrier package. In another alternative embodiment, the gate driver and/or the data driver may be integrated into the liquid crystal panel assembly, together with the display signal lines (e.g., the $n^{th}$ and $(n-1)^{th}$ gate lines Gn and Gn−1 and the data lines Da and Db) and the first and second switching devices Qa and Qb.

The signal controller (not shown) controls the operations of the gate driver and the data driver.

Next, the sensor area SENSOR AREA will be described in detail.

On the lower display panel of the liquid crystal panel assembly, power supply wiring Vdd, refresh wiring Vref, and output wiring Vout extend in a substantially column direction and are arranged substantially parallel to each other.

In order to determine whether an external force has been applied onto the liquid crystal panel assembly, the sensor area SENSOR AREA includes a sensor switching element Ts and a refresh switching device Tr. The refresh switching device Tr refreshes a sensor capacitor Cs, which is connected to the sensor switching element Ts, every frame. Each of the sensor switching element Ts and the refresh switching device Tr may include of a thin-film transistor provided on the lower display panel of the liquid crystal panel assembly.

The sensor switching element Ts includes an input terminal (hereinafter, referred to as a sensor source electrode 165 (see FIG. 2)) which is connected to the power supply wiring Vdd, an output terminal (hereinafter, referred to as a sensor drain electrode 166 (see FIG. 2)) which is connected to the output wiring Vout, and a control terminal (hereinafter, referred to as a sensor gate electrode 126 (see FIG. 2)) which is connected to the $(n-1)^{th}$ gate line Gn−1 with a coupling capacitor Ccp interposed therebetween. The sensor gate electrode 126 of the sensor switching element Ts is connected to the sensor capacitor Cs. The capacitance of the sensor capacitor Cs varies according to whether the touch screen display apparatus has been touched, and the sensor capacitor Cs uses a lower sensor electrode 182 (see FIG. 2) of the lower display panel and an upper sensor electrode 332 (see FIG. 9) of the upper display panel as its two terminals. The liquid crystal layer interposed 100 between the lower sensor electrode 182 and the upper sensor electrode 332 functions as a dielectric.

When the sensor switching element Ts is turned on after the gate-on voltage Von is applied to the $(n-1)^{th}$ gate line Gn−1, a sensing voltage, which is sent to the sensor source electrode 165 from the power supply wiring Vdd, is delivered to the output wiring Vout via the sensor drain electrode 166. In one exemplary embodiment, the sensing voltage may be about 10 volts (V) to about 15 volts (V). The sensor gate electrode 126 is connected to the $(n-1)^{th}$ gate line Gn−1 with the coupling capacitor Ccp interposed therebetween, and the sensor capacitor Cs, whose capacitance varies according to whether the touch screen display apparatus has been touched, is connected to the sensor gate electrode 126. Thus, a voltage applied to the sensor gate electrode 126 varies according to whether the touch screen display apparatus has been touched. When the voltage applied to the sensor gate electrode 126 varies, the amount of the sensing voltage delivered to the output wiring Vout also varies. Therefore, a touch on the touch screen display apparatus can be determined by detecting the sensing voltage.

The refresh switching device Tr includes an input terminal (hereinafter, referred to as a refresh source electrode 265 (see FIG. 2)) which is connected to the refresh wiring Vref, an output terminal (hereinafter, referred to as a refresh drain electrode 266 (see FIG. 2)) which is connected to the sensor gate electrode 126, and a control terminal (hereinafter, referred to as a refresh gate electrode 226 (FIG. 6)) which is connected to the $n^{th}$ gate line Gn.

When the refresh switching device Tr is turned on after the gate-on voltage Von is applied to the $n^{th}$ gate line Gn, a refresh voltage, which is sent to the refresh source electrode 265 from the refresh wiring Vref, is delivered to the sensor gate electrode 126 via the refresh drain electrode 266. In one exemplary embodiment, the refresh voltage may be about −5 V. When a touch is detected by the sensor switching element Ts, the refresh voltage is provided to the sensor switching element Ts every frame to refresh the sensor switching element Ts.

The way in which the touch screen display apparatus according to the first exemplary embodiment senses a touch thereon will now be described in detail with reference to FIG. 1.

When a force is applied to a point on the touch screen display apparatus, the distance between the lower and upper display panels of the liquid crystal panel assembly at the point is reduced. Accordingly, the distance between the lower and upper sensor electrodes of the sensor capacitor Cs is reduced, which, in turn, increases the capacitance of the sensor capacitor Cs.

When the gate-on voltage Von is applied to the $(n-1)^{th}$ gate line Gn−1, the sensing voltage is delivered to the output wiring Vout via the sensor switching element Ts. Specifically, a terminal of the coupling capacitor Ccp and a terminal of the sensor capacitor Cs are connected to the sensor gate electrode 126. The gate-on voltage Von is applied to the other terminal of the coupling capacitor Ccp, and the common voltage Vcom is applied to the other terminal of the sensor capacitor Cs.

When the touch screen display apparatus is touched, the capacitance of the sensor capacitor Cs is increased. Accordingly, the effect of the capacitance of the sensor capacitor Cs on the voltage, which is applied to the sensor gate electrode 126, increases. Since the common voltage Vcom applied to the other terminal of the sensor capacitor Cs is smaller than the gate-on voltage Von, the voltage applied to the sensor gate electrode 126 is reduced, and the sensing voltage delivered to the output wiring Vout via the sensor switching element Ts is also reduced. Therefore, whether the touch screen display apparatus has been touched can be sensed by measuring the variation in the sensing voltage sensed at the output wiring Vout.

Hereinafter, the touch screen display apparatus according to the first exemplary embodiment of the present invention will be described in detail with reference to FIGS. 2 through 9. The touch screen display apparatus according to the illustrated embodiment includes the lower display panel which includes a thin-film transistor array, the upper display panel which faces the lower display panel, and the liquid crystal layer 100 which is interposed between the lower and upper display panels.

Figure 2:
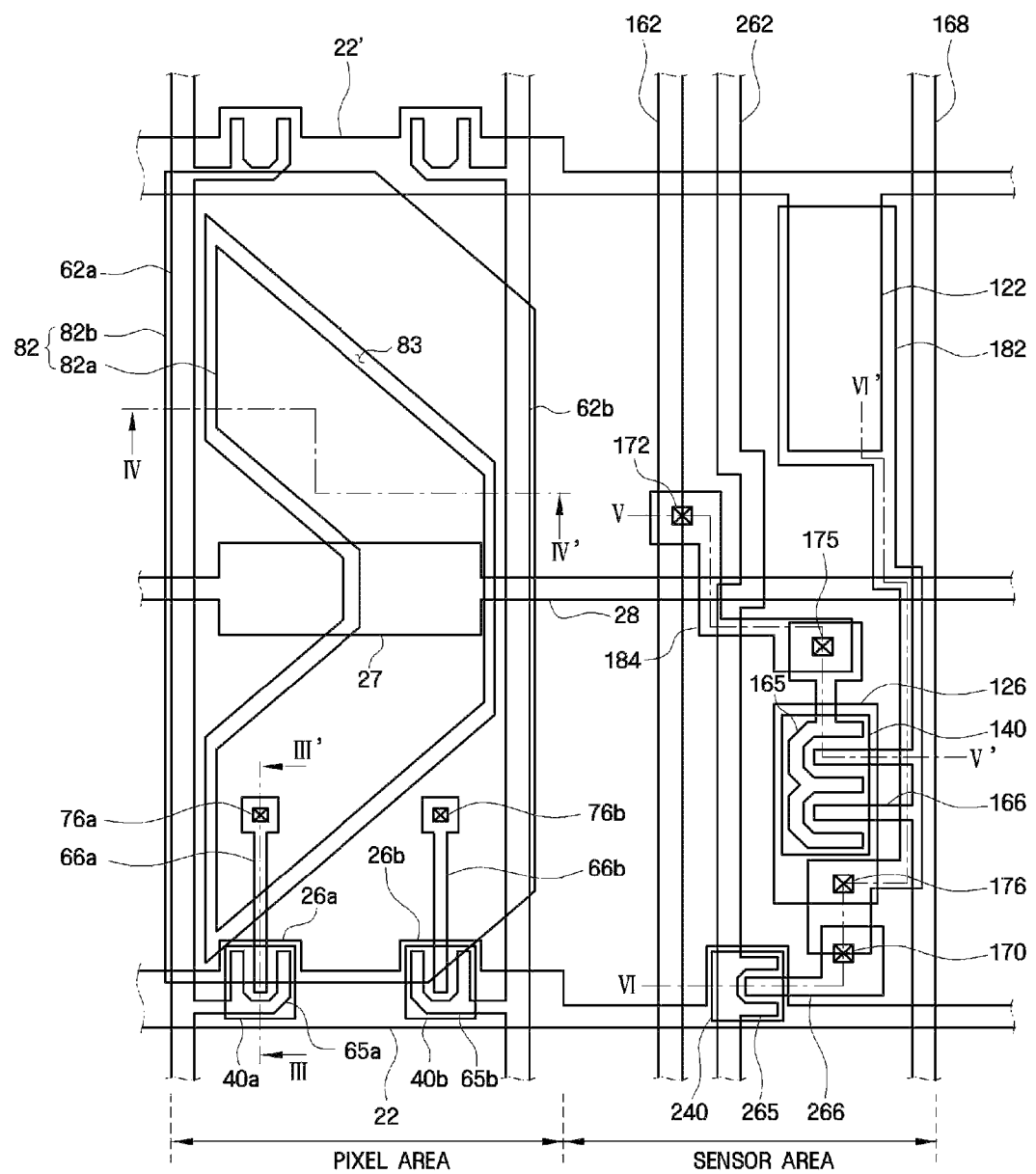
FIG. 2 is a layout diagram of an exemplary embodiment of a lower display panel of the touch screen display apparatus shown in FIG. 1.
Figure 3:
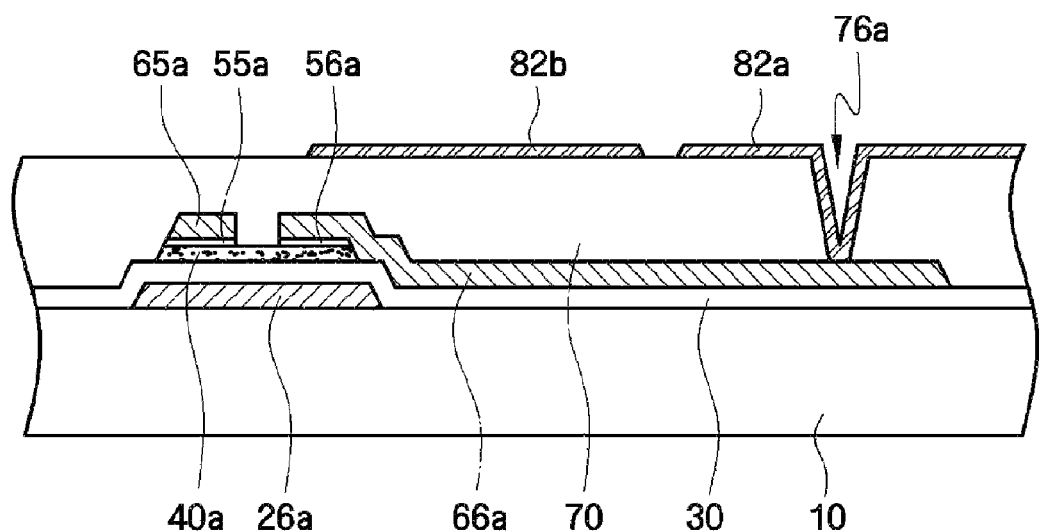
FIG. 3 is a cross-sectional view of the lower display panel taken along line III-III' of FIG. 2.
Figure 4:
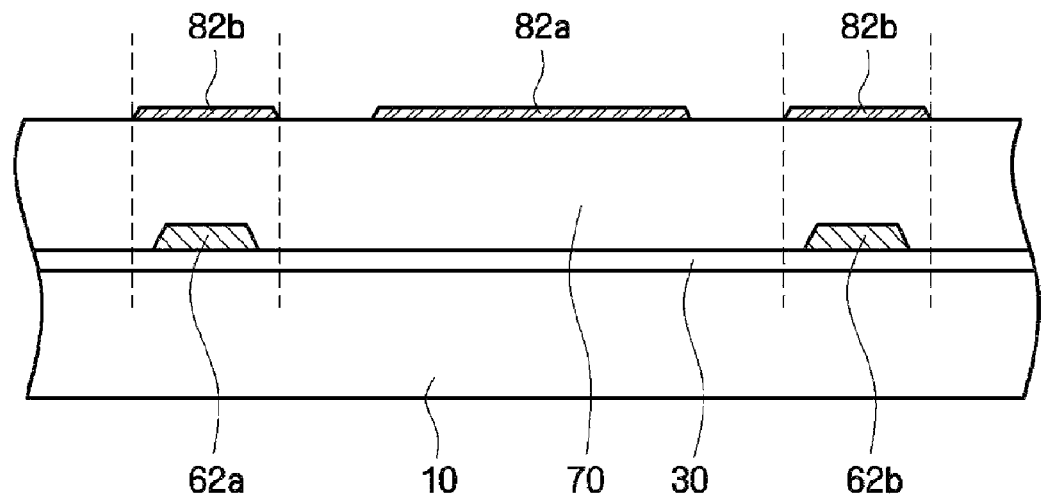
FIG. 4 is a cross-sectional view of the lower display panel taken along line IV-IV' of FIG. 2.
Figure 5:
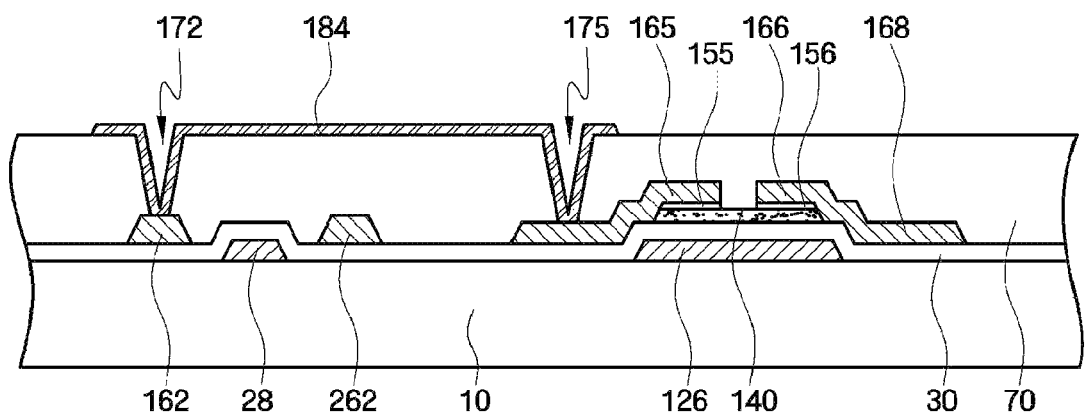
FIG. 5 is a cross-sectional view of the lower display panel taken along line V-V' of FIG. 2.
Figure 6:
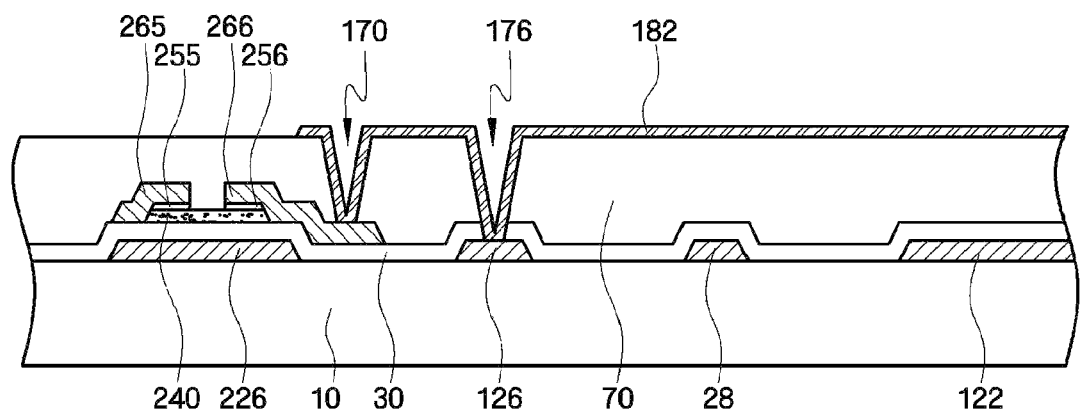
FIG. 6 is a cross-sectional view of the lower display panel taken along line VI-VI' of FIG. 2.

The lower display panel of the touch screen display apparatus according to the first exemplary embodiment will be described in detail with reference to FIGS. 2 through 6. FIG. 2 is a layout diagram of the lower display panel of the touch screen display apparatus shown in FIG. 1. FIG. 3 is a cross-sectional view of the lower display panel taken along line III-III' of FIG. 2. FIG. 4 is a cross-sectional view of the lower display panel taken along line IV-IV' of FIG. 2. FIG. 5 is a cross-sectional view of the lower display panel taken along line V-V' of FIG. 2. FIG. 6 is a cross-sectional view of the lower display panel taken along line VI-VI' of FIG. 2.

The pixel area PIXEL AREA of the touch screen display apparatus according to the first exemplary embodiment will now be described in detail.

Referring to FIGS. 2 through 4, a gate line 22 is disposed on an insulating substrate 10, which may include transparent glass. The gate line 22 extends in a (first) horizontal direction of the layout view and delivers a gate signal. In addition, the gate line 22 is allocated to each pixel PX, such that the gate line 22 is electrically connected and common to each pixel PX. The gate line 22 includes a pair of a gate electrode, such as a first protruding gate electrode 26a and a second protruding gate electrode 26b. The first and second protruding gate electrodes 26a and 26b are disposed continuous with the gate line 22. The gate line 22 and the first and second gate electrodes 26a and 26b are collectively referred to as gate wiring. In the exemplary embodiment, the PIXEL AREA includes a plurality of a gate electrode, such as the first and second gate electrodes 26a and 26b illustrated in FIG. 2.

A storage line 28 is also disposed on the insulating substrate 10. The storage line 28 extends in the (first) horizontal direction across the pixel area PIXEL AREA to be substantially parallel to the gate line 22. The storage line 28 an entire width of the PIXEL AREA in the (first) horizontal direction of the layout view. In addition, a storage electrode 27, which is wider than the storage line 28 in a (second) vertical direction of the layout view, is physically and electrically connected to the storage line 28. The storage electrode 27 is continuous with the storage line 28.

The storage electrode 27 overlaps a portion of a pixel electrode 82 to form a storage capacitor which improves the charge storage capability of each pixel PX. The storage electrode 27 and the storage line 28 are collectively referred to as storage wiring. In the illustrated embodiment, the storage wiring overlaps a central portion of the pixel area PIXEL AREA, the central part taken relative to the (second) vertical direction of the PIXEL AREA in the layout view. However, the present invention is not limited thereto, and the shape and disposition of the storage wiring may vary. Alternatively, if sufficient storage capacitance is generated by the overlapping of the pixel electrode 82 and the gate line 22, the storage wiring may not be formed.

In an exemplary embodiment, each of the gate wiring (e.g., the gate line 22 and the first and second gate electrodes 26a and 26b) and the storage wiring (e.g., the storage electrode 27 and the storage line 28) may include aluminum (Al)-based metal such as Al or an Al alloy, silver (Ag)-based metal such as Ag or an Ag alloy, copper (Cu)-based metal such as Cu or a Cu alloy, molybdenum (Mo)-based metal such as Mo or an Mo alloy, chrome (Cr), titanium (Ti), or tantalum (Ta).

In addition, each of the gate wiring and the storage wiring may include a multilayer structure including two conductive layers (not shown) with different physical characteristics. The multiple layers may be disposed in a third direction which is orthogonal to both the first and second directions of the layout view, such as substantially perpendicular to an upper surface of the insulating substrate 10. In an exemplary embodiment, one of the two conductive layers may include metal with relatively low resistivity, such as Al-based metal, Ag-based metal or Cu-based metal, in order to reduce a signal delay or a voltage drop of each of the gate wiring and the storage wiring. The other one of the conductive layers may include a different material, in particular, a material having superior contact characteristics with indium tin oxide ("ITO") and indium zinc oxide ("IZO"), such as Mo-based metal, Cr, Ti, or Ta. One exemplary embodiment of the multilayer structure includes a combination of a Cr lower layer and an Al upper layer and a combination of an Al lower layer and a Mo upper layer. However, the present invention is not limited thereto. The gate wiring and the storage wiring may include various metals and conductors.

A gate insulating film 30 is disposed on the gate line 22 and the storage wiring (e.g., the storage electrode 27 and the storage line 28). The gate insulating film 30 may include silicon nitride (SiNx).

A pair of a semiconductor layer, including first and second semiconductor layers 40a and 40b are disposed on the gate insulating film 30 and are made of hydrogenated amorphous silicon or polycrystalline silicon. The semiconductor layers 40a and 40b may have various shapes. In one exemplary embodiment, the semiconductor layers 40a and 40b may be substantially island-shaped or may be linear. In the illustrated embodiment, the semiconductor layers 40a and 40b may be island-shaped.

Each of the semiconductor layers 40a and 40b may include an oxide of a material selected from Zn, In, Ga, Sn, and a combination of the same. In one exemplary embodiment, each of the semiconductor layers 40a and 40b may include a mixed oxide, such as ZnO, InZnO, InGaO, InSnO, ZnSnO, GaSnO, GaZnO, GaZnSnO, or GaInZnO. When a mixed oxide is used to form each of the semiconductor layers 40a and 40b, ohmic contact properties of the semiconductor layers 40a and 40b with first and second source electrodes 65a and 65b, and first and second drain electrodes 66a and 66b are enhanced. Therefore, there is no need to dispose separate ohmic contact layers. In the exemplary embodiment, the PIXEL AREA includes a plurality of a source electrode, such as the first and second source electrodes 65a and 65b, and a plurality of a drain electrode, such as the first and second drain electrodes 66a and 66b illustrated in FIG. 2.

Ohmic contact layers 55a and 56a are disposed on each of the semiconductor layers 40a and 40b. The ohmic contact layers 55a and 56a may include a material such as silicide or n+ hydrogenated amorphous silicon doped with n-type impurities in high concentration. Referring to FIGS. 2 and 3, a pair of an ohmic contact layer, such as the ohmic contact layers 55a and 56a, are disposed on each of the semiconductor layers 40a and 40b.

Referring to FIGS. 2 and 4, a pair of a data line, such as a first data line 62a and a second data line 62b, and a pair of drain electrodes including the first and second drain electrodes 66a and 66b which correspond to the first and second data lines 62a and 62b, respectively, are disposed on the ohmic contact layers 55a and 56a and the gate insulating film 30.

The first and second data lines 62a and 62b extend substantially in the (second) vertical direction of the layout view, cross both the gate line 22 and the storage line 28, and deliver data voltages. The first and second data lines 62 and 62b are adjacent to each other in the PIXEL AREA. The first and second data lines 62a and 62b include the first and second source electrode 65a and 65b extending from the first and second data lines 62a and 62b and extending in the (first) horizontal direction toward the first and second drain electrodes 66a and 66b, respectively. The first and second source electrode 65a and 65b are disposed continuous with the first and second data lines 62 and 62b. As shown in FIG. 2, a pixel is divided into a pair of subpixels, and the first data line 62a delivers a data signal to one of the subpixels, while the second data line 62b delivers another data signal to the other one of the subpixels.

The first and second data lines 62a and 62b, the first and second source electrodes 65a and 65b, and the first and second drain electrodes 66a and 66b are collectively referred to as data wiring.

In an exemplary embodiment, the data wiring may include of Cr, Mo-based metal, or refractory metal such as Ta and Ti. In addition, the data wiring may include a multilayer structure including a lower layer (not shown), which is made of, e.g., refractory metal, and an upper layer (not shown) which is made of a material with low resistivity and disposed on the lower layer. The multiple layers may be disposed in the third direction which is orthogonal to both the first and second directions of the layout view, such as substantially perpendicular to an upper surface of the insulating substrate 10. Exemplary embodiments of the multilayer structure may include a combination of a Cr lower layer and an Al upper layer and a combination of an Al lower layer and a Mo upper layer. Alternatively, the multilayer structure may be a triple-layer structure including Mo—Al—Mo layers.

Referring to FIGS. 2 and 3, the first and second source electrodes 65a and 65b overlap a portion of the semiconductor layers 40a and 40b, respectively. In addition, the first and second drain electrodes 66a and 66b are disposed separated from and facing the first and second source electrodes 65a and 65b with respect to the first and second gate electrodes 26a and 26b, respectively. The first and second drain electrodes 66a and 66b overlap a portion of the semiconductor layers 40a and 40b, respectively. The ohmic contact layers 55a and 56a described above, are interposed between each of the semiconductor layers 40a and 40b, which are disposed thereunder, and each of the first and second source electrodes 65a and 65b, which are disposed thereon, and each of the first and second drain electrodes 66a and 66b which are disposed thereon. The ohmic contact layers 55a and 56a reduce contact resistance between each of the semiconductor layers 40a and 40b, and each of the first and second source electrodes 65a and 65b and each of the first and second drain electrodes 66a and 66b.

Referring to FIGS. 2 through 6, a passivation layer 70 is disposed on and directly contacting the data wiring (e.g., the first and second data lines 62a and 62b, the first and second source electrodes 65a and 65b, and the first and second drain electrodes 66a and 66b), and exposed portions of the semiconductor layers 40a and 40b. The passivation layer 70 may include an inorganic matter such as silicon nitride or silicon oxide, an organic matter having photosensitivity and superior planarization characteristics, and/or a low-k insulating material formed by plasma enhanced chemical vapor deposition ("PECVD"), such as a-Si:C:O or a-Si:O:F. The passivation layer 70 may include a double-layer structure including of a lower inorganic layer and an upper organic layer in order to protect the exposed portions of the semiconductor layers 40a and 40b, while taking advantage of the superior characteristics of the organic layer. Furthermore, a red, green, or blue color filter may be used as the passivation layer 70.

Referring to FIGS. 2 and 3, first and second contact holes 76a and 76b are disposed in the passivation layer 70, extending completely through the passivation layer 70 and exposing a portion of the first and second drain electrodes 66a and 66b. The first and second subpixel electrodes 82a and 82b are electrically connected to and directly contact the first and second drain electrodes 66a and 66b by the first and second contact holes 76a and 76b, respectively, and are substantially entirely disposed in the pixel area PIXEL AREA. In one exemplary embodiment, each of the first and second pixel electrodes 82a and 82b may include a transparent conductor such as ITO or IZO or a reflective conductor such as Al.

The first and second subpixel electrodes 82a and 82b are physically and electrically connected to the first and second drain electrodes 66a and 66b through the first and second contact holes 76a and 76b, respectively, and supplied with different data voltages from the first and second drain electrodes 66a and 66b, respectively.

The first and second subpixel electrodes 82a and 82b, to which the data voltages are applied, generate an electric field together with the common electrode 330 of the upper display panel of the liquid crystal panel assembly to determine the alignment of liquid crystal molecules 102 (see FIG. 9) interposed between the common electrode 330 and the first and second subpixel electrodes 82a and 82b.

As described above with reference to FIGS. 1 and 2, each of the first and second subpixel electrodes 82a and 82b and the common electrode 330 form the first or second liquid crystal capacitor Clca or Clcb, and thus sustain a voltage applied thereto even after a thin-film transistor, e.g., the first or second switching device Qa or Qb, is turned off. The first and second storage capacitors Csta and Cstb may be connected, in parallel, to the first and second liquid crystal capacitors Clca and Clcb, respectively, to strengthen a voltage storage capability. In the illustrated embodiment, each of the first and second storage capacitors Csta and Cstb is formed of an overlap of the storage wiring (e.g., the storage electrode 27 and the storage line 28) with either the first or second subpixel electrode 82a or 82b, or the first or second drain electrode 66a or 66b connected to the first or second subpixel electrode 82a or 82b.

Referring back to FIGS. 2 through 4, one pixel electrode 82 includes the first and second pixel electrodes 82a and 82b. In the layout view, the first and second pixel electrodes 82a and 82b, which engage with each other, are separated from each other by a predetermined gap 83 therebetween and are electrically insulated from each other. The first subpixel electrode 82a is substantially shaped like a "V" in the layout view. In each pixel PX, the second subpixel electrode 82b is disposed outside of the first subpixel electrode 82a, and includes an inner area shaped similar to the first subpixel electrode 82a. In the illustrated embodiment, the second subpixel electrode 82b surrounds a whole of the first subpixel electrode 82a. The first and second pixel electrodes 82a and 82b are considered engaged with each other since the second subpixel electrode 82b includes an inner area shaped similar to an outer boundary of the first subpixel electrode 82a and since the second subpixel electrode 82b surrounds the whole of the first subpixel electrode 82a The gap 83 includes oblique portions, each being at an angle of approximately 45 or −45 degrees to the gate line 22, and vertical portions which connect the oblique portions and extend substantially parallel to the first and second data lines 62a and 62b, along the (second) vertical direction of the layout view.

Although not shown in the drawings, an exemplary embodiment of each of the first and second subpixel electrodes 82a and 82b may include domain partition portions (not shown) (such as cutouts or protrusions), each being at an angle of approximately 45 or −45 degrees to the gate line 22. A display area of the pixel electrode 82 is partitioned into a plurality of domains according to the direction in which main directors of the liquid crystal molecules 102 included in the liquid crystal layer 100 are aligned when an electric field is applied to the liquid crystal layer 100. The gap 83 and the domain partition portions partition the pixel electrode 82 into a plurality of domains. A domain denotes an area including liquid crystal molecules 102 whose directors tilt together in a certain direction due to an electric field formed between the pixel electrode 82 and the common electrode 330 (see FIG. 7).

As described above, the first subpixel electrode 82a is shaped like a "V" and surrounds the first subpixel electrode 82a. The second subpixel electrode 82b is adjacent to the oblique portions of the gap 83 and includes main areas and bridge areas. The main areas, each being at an angle of approximately 45 or −45 degrees to the gate line 22, control the movement of the liquid crystal molecules 102. In addition, the bridge areas are adjacent to the vertical portions of the gap 83 and extend substantially parallel to the first and second data lines 62a and 62b to connect the main areas.

As shown in FIGS. 2 and 4, the first and second data lines 62a and 62b overlap at least a portion of the second subpixel electrode 82b. Preferably, the first and second data lines 62a and 62b are completely overlapped by second subpixel electrode 82b in a widthwise direction of the first and second data lines 62a and 62b taken along the (first) horizontal direction of the layout view. Specifically, the first and second data lines 62a and 62b overlap portions of the bridge areas of the second subpixel electrode 82b, and are disposed adjacent to longitudinal edges of the second subpixel electrode 82b.

A first alignment layer 302 (see FIG. 9), which can align the liquid crystal molecules 102, may be disposed on the first and second subpixel electrodes 82a and 82b and the passivation layer 70. Specifically, the first alignment layer 302 is disposed in the pixel area PIXEL AREA of the lower display panel of the liquid crystal panel assembly, and may be a vertical alignment layer which aligns the liquid crystal molecules 102 at an angle of about 70 degrees to about 90 degrees with respect to a surface thereof.

Next, the sensor area SENSOR AREA of the touch screen display apparatus according to the first exemplary embodiment of the present invention will be described in detail.

Referring to FIGS. 2, 5 and 6, a coupling electrode 122 is disposed on the insulating substrate 10 and protrudes from a previous gate line 22' which extends substantially parallel to the gate line 22. The coupling electrode 122 is continuous with the previous gate line 22'. In addition, the sensor gate electrode 126 is disposed on the insulating substrate 10 and interposed between the gate line 22 and the previous gate line 22' in the layout view. The gate line 22 includes the protruding refresh gate electrode 226 which is continuous with the gate line 22. The coupling electrode 122, the sensor gate electrode 126, and the refresh gate electrode 226 may include the same material and be disposed on the same layer as the gate wiring (e.g., the gate line 22 and the first and second gate electrodes 26a and 26b) as described above.

The gate insulating film 30 is disposed on the coupling electrode 122, the sensor gate electrode 126, and the refresh gate electrode 226.

A sensor semiconductor layer 140, which overlaps the sensor gate electrode 126, and a refresh semiconductor layer 240, which overlaps the refresh gate electrode 226, are disposed on the gate insulating film 30. The sensor semiconductor layer 140 and the refresh semiconductor layer 240 may include hydrogenated amorphous silicon or polycrystalline silicon.

Ohmic contact layers 155, 156, 255 and 256 may each include a material, such as silicide or n+ hydrogenated amorphous silicon doped with n-type impurities in high concentration, and may be disposed on the sensor semiconductor layer 140 and the refresh semiconductor layer 240. A pair of an ohmic contact layer, such as the ohmic contact layers 155 and 156, is disposed on the sensor semiconductor layer 140, and a pair of an ohmic contact layer, such as the ohmic contact layers 255 and 256, is disposed on the refresh semiconductor layer 240.

Power supply wiring 162, refresh wiring 262, and output wiring 168 are disposed on the ohmic contact layers 155, 156, 255 and 256 and the gate insulating film 30. Each of the power supply wiring 162, the refresh wiring 262, and the output wiring 168 are longitudinally extended in the (second) vertical direction in the layout view, and may collectively be referred to as sensor wiring.

Referring to FIGS. 2 and 5, the sensor source electrode 165 disposed on the ohmic contact layer 155 overlaps a portion of the sensor semiconductor layer 140 and is physically and electrically connected to the power supply wiring 162 by a bridge electrode 184. The sensor drain electrode 166 disposed on the ohmic contact layer 156 overlaps a portion of the sensor semiconductor layer 140, faces the sensor source electrode 165 with respect to the sensor gate electrode 126, and is physically and electrically connected to the output wiring 168. The sensor drain electrode 166 is an extension of the output wiring 168 and is continuous with the output wiring 168 to be considered electrically connected to the output wiring 168.

Referring to FIGS. 2 and 6, the refresh source electrode 265 protrudes from the refresh wiring 262 and overlaps a portion of the refresh semiconductor layer 240. The refresh source electrode 265 is a continuous extension of the refresh wiring 262. The refresh drain electrode 266 faces the refresh source electrode 265 with respect to the refresh gate electrode 226, and overlaps a portion of the refresh semiconductor layer 240.

Referring to FIGS. 2 and 5, the ohmic contact layers 155 and 156 are interposed between the sensor semiconductor layer 140, which is disposed thereunder, and the sensor source electrode 165 and the sensor drain electrode 166, which are disposed thereon, respectively, to reduce contact resistance between the sensor semiconductor layer 140, and the sensor source electrode 165 and the sensor drain electrode 166.

The passivation layer 70 is disposed on the power supply wiring 162, the refresh wiring 262, and the output wiring 168.

The bridge electrode 184 disposed on the passivation layer 70 is electrically connected to the power supply wiring 162 through a contact hole 172, and is electrically connected to the sensor source electrode 165 by another contact hole 175.

Referring to FIGS. 2 and 6, the lower sensor electrode 182 disposed on the passivation layer 70 overlaps the coupling electrode 122 with the gate insulating film 30 and the passivation layer 70 interposed therebetween, to form a coupling capacitor. In addition, the lower sensor electrode 182 is electrically connected to the sensor gate electrode 126 through a contact hole 176, and is electrically connected to the refresh drain electrode 266 through another contact hole 170. In an exemplary embodiment, the bridge electrode 184 may include a transparent conductor, such as ITO or IZO, or a reflective conductor such as Al.

A second alignment layer 304 (see FIG. 9), which can align the liquid crystal molecules 102, may be disposed on the lower sensor electrode 182. Specifically, the second alignment layer 304 is disposed in the sensor area SENSOR AREA of the lower display panel, and may be a horizontal alignment layer which aligns the liquid crystal molecules 102, such as at an angle of about 0 degrees to about 20 degrees with respect to a surface thereof.

Referring again to FIGS. 2, 5 and 6, the sensor switching element Ts is a three-terminal device that includes the sensor gate electrode 126 electrically connected to the lower sensor electrode 182 which overlaps the coupling electrode 122, the sensor source electrode 165 electrically connected to the power supply wiring 162, and the sensor drain electrode 166 connected to the output wiring 168. In addition, the refresh switching device Tr is a three-terminal device that includes the refresh gate electrode 226 electrically connected to the gate line 22, the refresh source electrode 265 electrically connected to the refresh wiring 262, and the refresh drain electrode 266 electrically connected to the lower sensor electrode 182.

In the illustrated exemplary embodiment of the liquid crystal panel assembly, all of the essential elements of a touch panel are incorporated between the single pair of substrates 10 and 310, and within planar boundaries of the liquid crystal panel assembly, such as disposed in an area defined by gate lines, data lines and sensor wiring. Since essential elements of the touch panel are not separate from the elements of the liquid crystal panel assembly, such that the touch panel elements are additively disposed on the elements of the liquid crystal panel assembly, a size of the touch screen display apparatus including features of a touch panel is not increased. Advantageously, the touch screen display apparatus is relatively light, thin, and small in overall dimension, which can be easily transported and manufactured.

Figure 7:
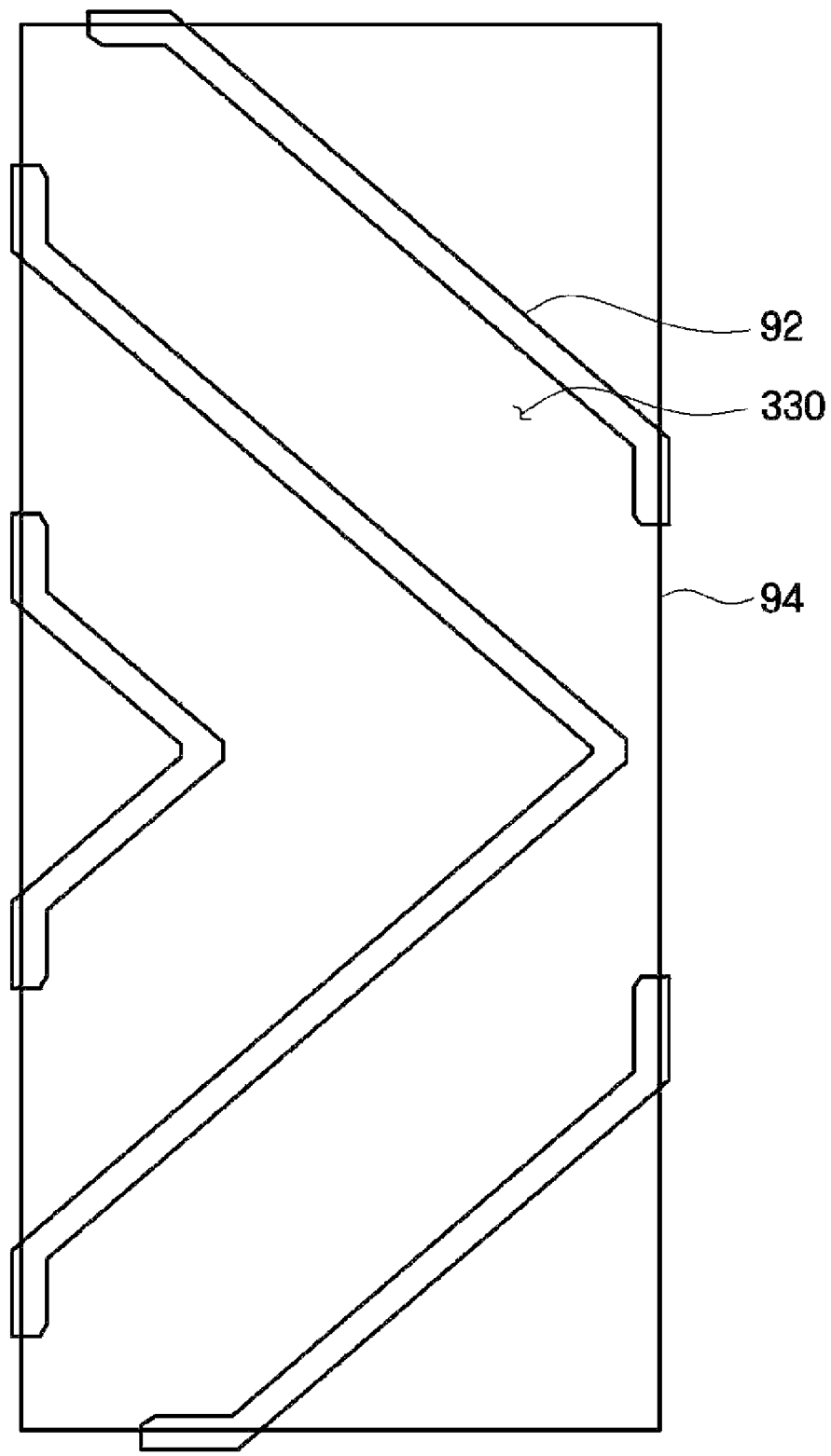
FIG. 7 is a layout diagram of an exemplary embodiment of an upper display panel which is coupled to the lower display panel of FIG. 2.
Figure 8:
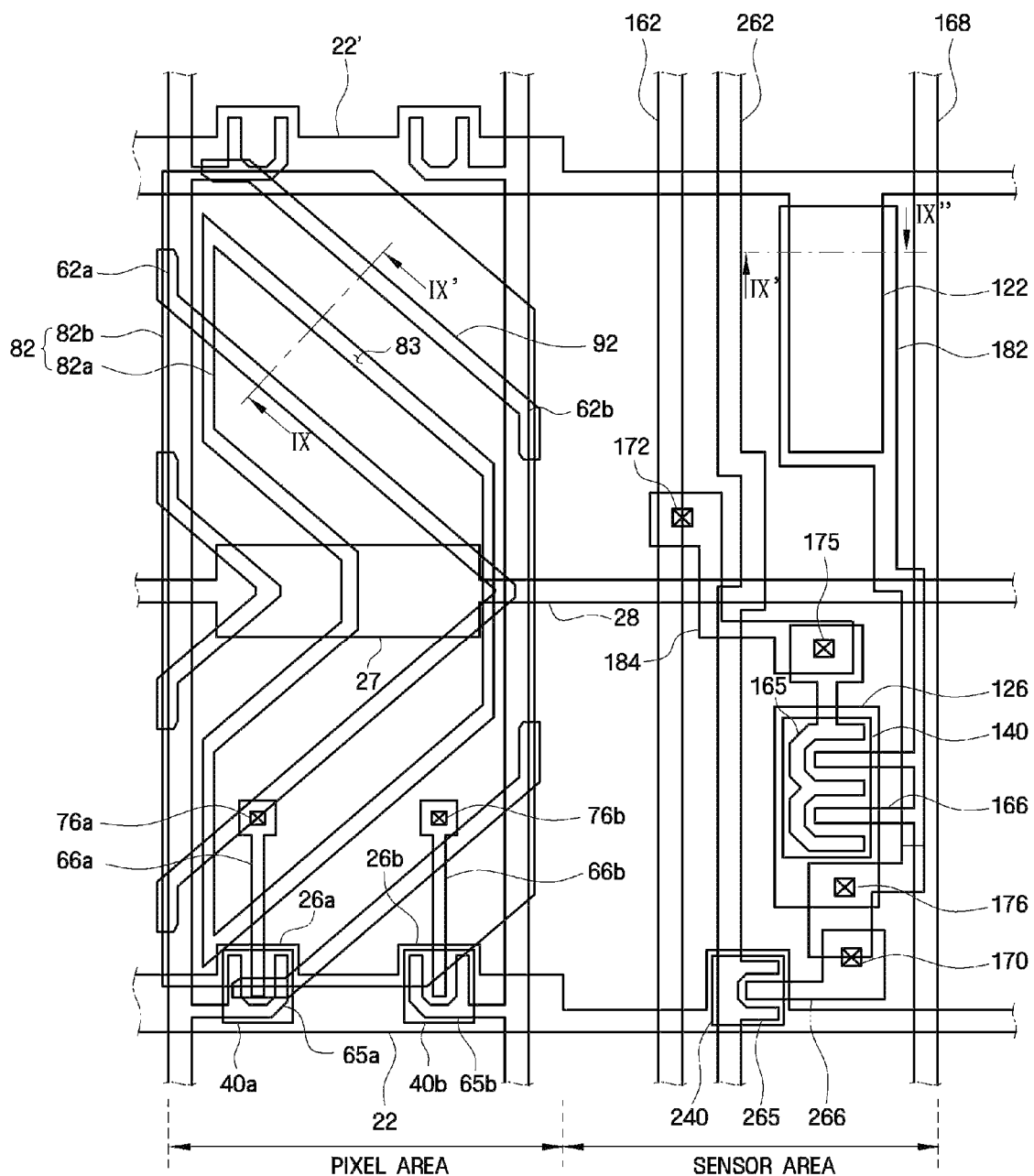
FIG. 8 is a layout diagram of an exemplary embodiment of the touch screen display apparatus including the lower display panel of FIG. 2 and the upper display panel of FIG. 7.
Figure 9:
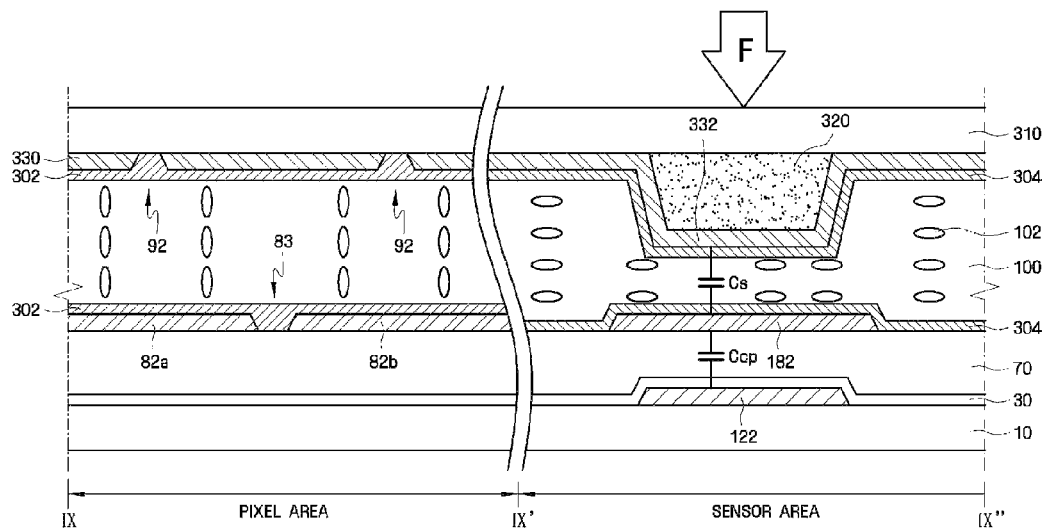
FIG. 9 is a cross-sectional view of the touch screen display apparatus taken along lines IX-IX' and IX'-IX" of FIG. 8.

Hereinafter, the upper display panel and the touch screen display apparatus according to the first exemplary embodiment will be described in detail with reference to FIGS. 7 through 9. FIG. 7 is a layout diagram of the upper display panel which is coupled to the lower display panel of FIG. 2. FIG. 8 is a layout diagram of the touch screen display apparatus including the lower display panel of FIG. 2 and the upper display panel of FIG. 7. FIG. 9 is a cross-sectional view of the touch screen display apparatus taken along the IX-IX' and IX'-IX" of FIG. 8.

Referring to FIGS. 7 through 9, a black matrix 94 is disposed on an insulating substrate 310, which may include transparent glass. The black matrix 94 prevents leakage of light and may define the pixel area PIXEL AREA. In one exemplary embodiment, the black matrix 94 may be disposed in a region defined by the gate line 22, the first and second data lines 62a and 62b, and a thin film transistor. Alternatively, the black matrix 94 may also be disposed on the lower display panel. The black matrix 94 may include metal (metal oxide), such as Cr (Cr oxide), or organic black resist. In portions of the pixel area PIXEL AREA between the black matrix, red, green and blue color filters (not shown) may be sequentially arranged. Alternatively, the red, green and blue color filters may also be disposed on the lower display panel.

A sensor spacer 320 is disposed on the insulating substrate 310. A distal end of the sensor spacer 320 protruded from the insulating substrate 310 defines a cell gap overlapping the distal end which is smaller than a cell gap between remaining portions of the lower display panel and the upper display panel. The cell gap is taken in the third direction, such as substantially perpendicular to a lower planar surface of the insulating substrate 310. The sensor spacer 320 includes a substantially flat surface at the distal end, which faces the lower sensor electrode 182, and sides which extend upward from edges of the flat surface. The sides of the sensor spacer 320 may be inclined with respect to the lower planar surface of the insulating substrate 310.

The sensor spacer 320 overlaps a portion of the lower sensor electrode 182. While the size of the sensor spacer 320 is different from that of a cell-gap spacer (not shown), which is interposed between the lower display panel and the upper display panel to maintain the cell gap therebetween, the sensor spacer 320 may include substantially the same material as the cell-gap spacer. In one exemplary embodiment, the sensor spacer 320 may be formed by hardening an organic material, such as photosensitive resin. In an alternative embodiment, the sensor spacer 320 may include a stack of one or more color filter layers.

The common electrode 330 is disposed on the insulating substrate 310 and may include a transparent conductive material, such as ITO or IZO. The common electrode 330 faces the first and second subpixel electrodes 82a and 82b, and includes domain partition portions 92 (such as cutouts or protrusions), each being at an angle of approximately 45 or −45 degrees to the gate line 22. A portion of the common electrode 330, which is disposed on the sensor spacer 320, is referred to as the upper sensor electrode 332.

When a touch action F is applied to the touch screen display apparatus, the distance between the upper sensor electrode 332 and the lower sensor electrode 182 is reduced, which, in turn, increases the capacitance of the sensor capacitor Cs between them. Whether the touch screen display apparatus has been touched can be determined by detecting the variation in the capacitance of the sensor capacitor Cs.

As described above, the first alignment layer 302, which is a vertical alignment layer, is disposed on the first and second subpixel electrodes 82a and 82b in the pixel area PIXEL AREA and on the common electrode 330 in the pixel area PIXEL AREA. The first alignment layer 302 aligns the liquid crystal molecules 102 at an angle of about 70 degrees to about 90 degrees with respect to the surface thereof.

In addition, the second alignment layer 304, which is a horizontal alignment layer, is disposed on the lower sensor electrode 182 in the sensor area SENSOR AREA and on the common electrode 330 in the sensor area SENSOR AREA, e.g., the upper sensor electrode 332. The second alignment layer 304 aligns the liquid crystal molecules 102 at an angle of about 0 degrees to about 20 degrees with respect to the surface thereof.

The lower and upper display panels of the liquid crystal panel assembly structured as described above, may be aligned and coupled to each other, and the liquid crystal molecules 102 may be injected between the lower and upper display panels to form the structure of the touch screen display apparatus.

The illustrated exemplary embodiment of the liquid crystal panel assembly includes all of the elements of both a liquid crystal panel and a touch panel incorporated between a single pair of substrates and within planar boundaries of the liquid crystal panel assembly. Advantageously, a size of the touch screen display apparatus including features of a touch panel is not increased, such that the touch screen display apparatus is relatively light, thin, and small in overall dimension, which can be easily transported and manufactured.

The touch screen display apparatus according to the illustrated embodiment operates in a vertical alignment mode, and the liquid crystal molecules 102 included in the liquid crystal layer 100 has negative dielectric anisotropy. Thus, when an electric field is applied to the liquid crystal molecules 102, the liquid crystal molecules 102 are realigned such that their long axes or directors are substantially perpendicular to the direction of the electric field.

Here, dielectric anisotropy ($\Delta\epsilon$) is a value obtained by subtracting a dielectric constant ($\epsilon\perp$) of liquid crystal molecules in a short-axis direction from a dielectric constant ($\epsilon\|$) of the liquid crystal molecules in a long-axis direction. Table 1 below shows dielectric constants of liquid crystal molecules (Samples 1 through 3) having negative dielectric anisotropy.

TABLE 1

|  | Sample 1 | Sample 2 | Sample 3 |
|---|---|---|---|
| $\epsilon_\|$ | 3.6 | 3.5 | 3.4 |
| $\epsilon_\perp$ | 7.4 | 6.9 | 6.7 |
| $\epsilon_\perp/\epsilon_\|$ | 2.06 | 1.97 | 1.97 |

Referring to Table 1, the dielectric constant ($\epsilon\perp$) of the liquid crystal molecules, which have negative dielectric anisotropy, in the short-axis direction is approximately twice the dielectric constant ($\epsilon\|$) of the liquid crystal molecules in the long-axis direction.

Referring to FIG. 9, when no electric field is applied between the pixel electrode 82 and the common electrode 330, the liquid crystal molecules 102 in the pixel area PIXEL AREA are aligned with their directors being substantially perpendicular to the lower and upper display panels of the liquid crystal panel assembly due to the first alignment layer 302. In addition, the liquid crystal molecules 102 in the sensor area SENSOR AREA are aligned with their directors being substantially parallel to the lower and upper display panels due to the second alignment layer 304.

The capacitance of the sensor capacitor Cs is determined by the size of the lower sensor electrode 182, the size of the upper sensor electrode 332, the distance between the lower sensor electrode 182 and the upper sensor electrode 332, and the dielectric constant of the liquid crystal molecules 102 interposed between the lower sensor electrode 182 and the upper sensor electrode 332. The dielectric constant ($\epsilon\perp$) of the liquid crystal molecules 102, which have negative dielectric anisotropy, in the short-axis direction is greater than the dielectric constant ($\epsilon\|$) of the liquid crystal molecules 102 in the long-axis direction. Therefore, when other conditions are equal, the capacitance of the sensor capacitor Cs is greater, e.g., doubles, when the liquid crystal molecules 102 in the sensor area SENSOR AREA are horizontally aligned than when vertically aligned.

When the dielectric constant of the liquid crystal molecules 102 which form the sensor capacitor Cs increases, the variation in the capacitance of the sensor capacitor Cs in response to the touch action F is increased, thereby increasing sensing sensitivity. A thickness of the sensor spacer 320 from the insulating substrate 310 in the third direction may be further increased to reduce the distance between the lower sensor electrode 182 and the upper sensor electrode 332, and thus to increase sensing sensitivity. However, when the dielectric anisotropy of the liquid crystal molecules 102 is used as in the illustrated embodiment, sensing sensitivity can be further increased without further increasing the thickness of the sensor spacer 320.

In an exemplary embodiment, the touch screen display apparatus includes elements, such as polarizers and a backlight, which are installed in the above structure of the touch screen display apparatus. The polarizers may be disposed on both of outer sides of the basic structure, respectively. A transmission axis of a first polarizer may be substantially parallel to the gate line 22, and a transmission axis of the second polarizer may be substantially perpendicular to the gate line 22.

When an electric field is applied between the lower and upper display panels of the liquid crystal panel assembly, an electric field perpendicular to the two display panels is formed in most of the pixel area PIXEL AREA. However, a horizontal electric field is formed adjacent to and around the gap 83 of the pixel electrode 82, and adjacent to and around the domain partition portions 92 of the common electrode 330. The horizontal electric field effects the alignment of the liquid crystal molecules 102 in each domain.

Since the liquid crystal molecules 102 according to the illustrated embodiment have negative dielectric anisotropy, the liquid crystal molecules 102 in each domain tilt in a direction substantially perpendicular to the gap 83 or the domain partition portions 92 which defines or define each domain. Therefore, the liquid crystal molecules 102 tilt in opposite directions from the gap 83 or each of the domain partition portions 92. In addition, since the oblique portions of the gap 83 or oblique portions of the domain partition portions 92 are symmetrical to each other with respect to a center of each pixel PX, the liquid crystal molecules 102 tilt in four directions at an angle of approximately 45 or −45 degrees to the gate line 22. When the liquid crystal molecules 102 tilt in four directions as described above, their optical characteristics are compensated for, thereby widening a viewing angle.

The operation of the touch screen display apparatus according to the first exemplary embodiment will now be described in detail with reference to FIGS. 2 through 9.

A relatively high data voltage is applied to the first subpixel electrode 82a via the first data line 62a, and a relatively low data voltage is applied to the second subpixel electrode 82b via the second data line 62b. Consequently, the lateral visibility of the touch screen display apparatus may be enhanced.

In an exemplary embodiment, when the touch screen display apparatus operates at a low gray voltage, liquid crystals are actually driven by the first subpixel electrode 82a to which a relatively high voltage is applied, and no voltage is applied to the second subpixel electrode 82b. Since substantially the same voltage as a voltage applied to the common electrode 330 of the upper display panel is applied to the second subpixel electrode 82b, the directors of the liquid crystal molecules 102 above the second subpixel electrode 82b are aligned perpendicular to the lower display panel. Hence, light emitted from the backlight cannot pass through the second subpixel electrode 82b.

In an exemplary embodiment, when the touch screen display apparatus operates at a high gray voltage, the leakage of light essentially does not matter because the overall luminance of the touch screen display apparatus is relatively high. Thus, it is important to reduce or effectively prevent the leakage of light when the touch screen display apparatus operates at a low gray voltage.

The leakage of light may occurs around the first and second data lines 62a and 62b. However, if the second subpixel electrode 82b overlaps the first and second data lines 62a and 62b as in the illustrated embodiment, when the touch screen display apparatus operates at a low gray voltage, light cannot pass through the second subpixel electrode 82b. Advantageously, the leakage of light around the first and second data lines 62a and 62b can be reduced or effectively prevented. Since the leakage of light can be reduced or effectively prevented by using the second subpixel electrode 82b, which surrounds the first subpixel electrode 82a, and without increasing the size of the black matrix 94, an aperture ratio of the touch screen display apparatus can be increased.

In an alternative exemplary embodiment of the upper display panel described above, the sensor spacer 320 may be replaced by a color filter, and an overcoat layer (not shown) may be disposed on or under the sensor spacer 320.

Figure 10:
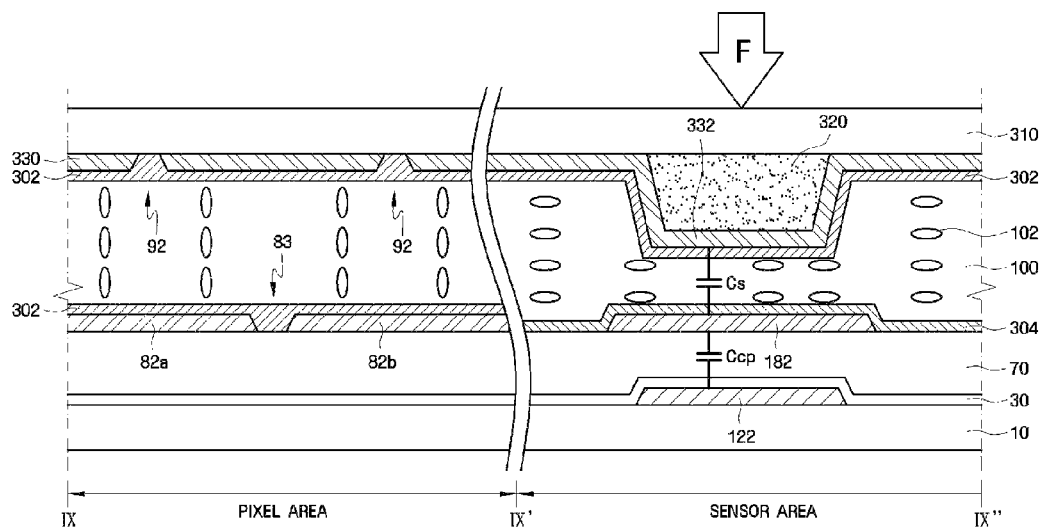
FIG. 10 is a cross-sectional view of a touch screen display apparatus according to a second exemplary embodiment of the present invention.

Hereinafter, a touch screen display apparatus according to a second exemplary embodiment of the present invention will be described in detail with reference to FIG. 10. FIG. 10 is a cross-sectional view of the touch screen display apparatus according to the second exemplary embodiment of the present invention. For simplicity, elements substantially identical to those shown in the drawings for the first exemplary embodiment are indicated by like reference numerals, and thus their description will be omitted. Hence, the difference between the present and previous embodiments will mainly be described.

Referring to FIG. 10, a first alignment layer 302, which is a vertical alignment layer, is disposed on an upper sensor electrode 332 in a sensor area SENSOR AREA. Thus, the initial alignment of liquid crystal molecules 102 in the sensor area SENSOR AREA is determined by a second alignment layer 304, which is a horizontal alignment layer, and the first alignment layer 302 which is a vertical alignment layer. At least a portion of the liquid crystal molecules 102 is horizontally aligned by the second alignment layer 304 disposed on a lower sensor electrode 182. The dielectric constant of the capacitance of a sensor capacitor Cs may be greater when the portion of the liquid crystal molecules 102 is horizontally aligned by the second alignment layer 304 disposed on a lower sensor electrode 182, than when all of the liquid crystal molecules 102 in the sensor area SENSOR AREA are vertically aligned. As a result, sensing sensitivity can be advantageously increased.

Figure 11:
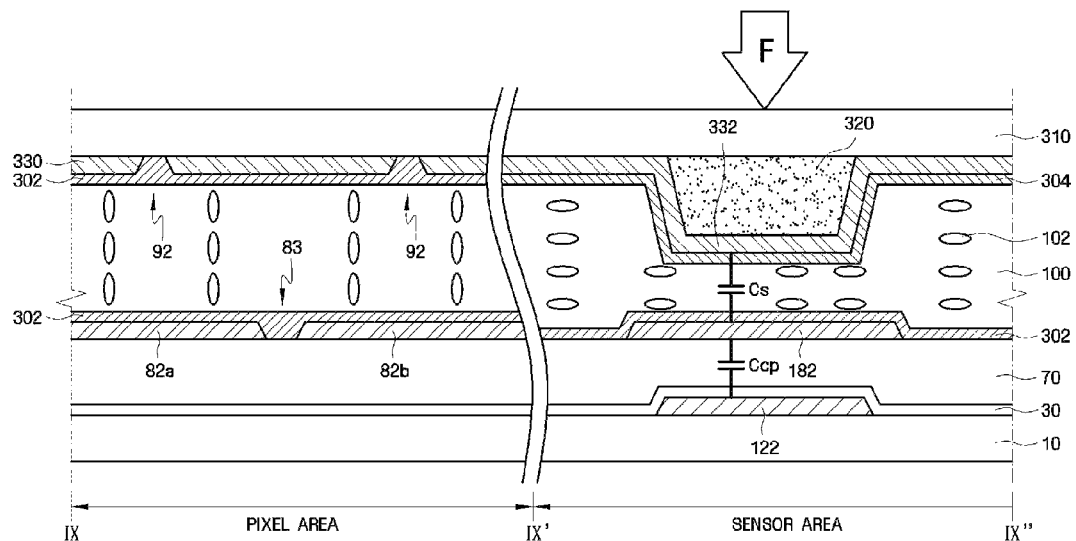
FIG. 11 is a cross-sectional view of a touch screen display apparatus according to a third exemplary embodiment of the present invention.

Hereinafter, a touch screen display apparatus according to a third exemplary embodiment will be described in detail with reference to FIG. 11. FIG. 11 is a cross-sectional view of the touch screen display apparatus according to the third exemplary embodiment of the present invention. For simplicity, elements substantially identical to those shown in the drawings for the first exemplary embodiment are indicated by like reference numerals, and thus their description will be omitted. Hence, the difference between the present and previous embodiments will mainly be described.

Referring to FIG. 11, a first alignment layer 302, which is a vertical alignment layer, is disposed on a lower sensor electrode 182 in a sensor area SENSOR AREA. Thus, the initial alignment of liquid crystal molecules 102 in the sensor area SENSOR AREA is determined by a second alignment layer 304, which is a horizontal alignment layer, and the first alignment layer 302 which is a vertical alignment layer. At least a portion of the liquid crystal molecules 102 are horizontally aligned by the second alignment layer 304 on an upper sensor electrode 332. The dielectric constant of the capacitance of a sensor capacitor Cs may be greater than when all of the liquid crystal molecules 102 in the sensor area SENSOR AREA are vertically aligned. As a result, sensing sensitivity can be advantageously increased.

In the first through third exemplary embodiments of FIGS. 1 through 11, the touch screen display apparatuses operating in the vertical alignment mode have been described. However, the present invention is not limited thereto, and the above description may also apply to the following touch screen display apparatuses which operate in a twisted nematic mode.

Figure 12:
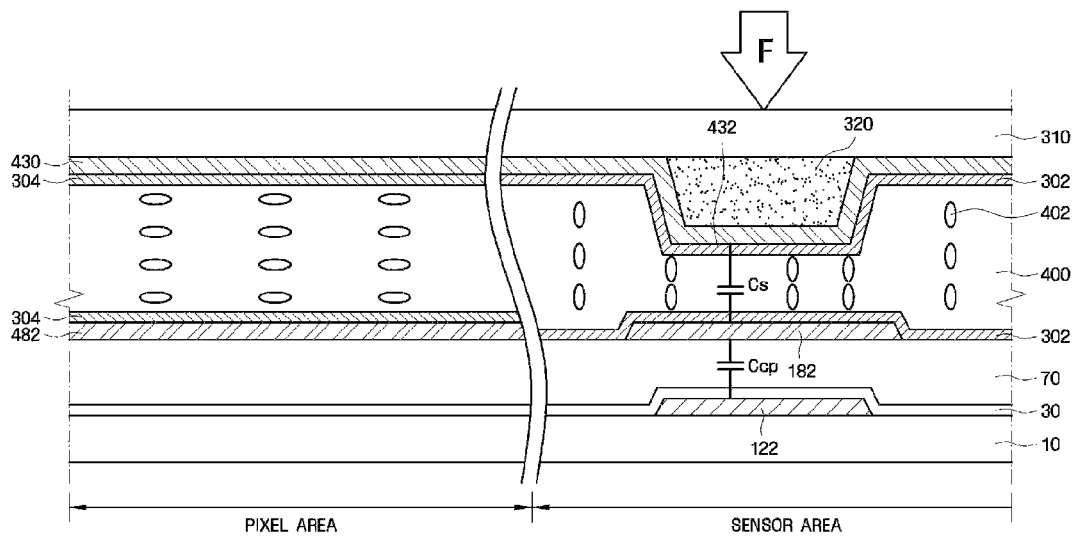
FIG. 12 is a cross-sectional view of a touch screen display apparatus according to a fourth exemplary embodiment of the present invention.

Hereinafter, a touch screen display apparatus according to a fourth exemplary embodiment of the present invention will be described in detail with reference to FIG. 12. FIG. 12 is a cross-sectional view of the touch screen display apparatus according to the fourth exemplary embodiment of the present invention. For simplicity, elements substantially identical to those shown in the drawings for the first exemplary embodiment are indicated by like reference numerals, and thus their description will be omitted. Hence, the difference between the present and previous embodiments will mainly be described.

The touch screen display apparatus according to the illustrated embodiment operates in the twisted nematic mode, and liquid crystal molecules 402 included in a liquid crystal layer 400 has positive dielectric anisotropy. Thus, when an electric field is applied to the liquid crystal molecules 402, the liquid crystal molecules 402 are realigned such that their long axes or directors are parallel to the direction of the electric field.

Since the liquid crystal molecules 402 have positive dielectric anisotropy, a dielectric constant ($\in\|$) of the liquid crystal molecules 402 in a long-axis direction is approximately two or three times a dielectric constant ($\in\bot$) of the liquid crystal molecules 402 in a short-axis direction.

A second alignment layer 304, which is a horizontal alignment layer, is disposed on a pixel electrode 482 in a pixel area PIXEL AREA and on a common electrode 430 in the pixel area PIXEL AREA. The second alignment layer 304 aligns the liquid crystal molecules 402 at an angle of about 0 degrees to about 20 degrees with respect to a surface thereof.

A first alignment layer 302, which is a vertical alignment layer, is disposed on a lower sensor electrode 182 in the sensor area SENSOR AREA and on the common electrode 430 in the sensor area SENSOR AREA, e.g., an upper sensor electrode 432. The first alignment layer 302 aligns the liquid crystal molecules 402 at an angle of about 70 degrees to about 90 degrees with respect to a surface thereof.

Referring to FIG. 12, when no electric field is applied between the pixel electrode 482 and the common electrode 430, the liquid crystal molecules 402 in the pixel area PIXEL AREA are aligned with their directors being substantially parallel to lower and upper display panels due to the second alignment layer 304. In addition, the liquid crystal molecules 402 in the sensor area SENSOR AREA are aligned with their directors being substantially perpendicular to the lower and upper display panels due to the first alignment layer 302.

The capacitance of the sensor capacitor Cs is determined by the size of the lower sensor electrode 182, the size of the upper sensor electrode 432, the distance between the lower sensor electrode 182 and the upper sensor electrode 432, and the dielectric constant of the liquid crystal molecules 402 interposed between the lower sensor electrode 182 and the upper sensor electrode 432. The dielectric constant ($\in\|$) of the liquid crystal molecules 402, which have positive dielectric anisotropy, in the long-axis direction is greater than the dielectric constant ($\in\bot$) of the liquid crystal molecules 402 in the short-axis direction. Therefore, when other conditions are equal, the capacitance of the sensor capacitor Cs is greater, e.g., doubles or trebles, when the liquid crystal molecules 402 in the sensor area SENSOR AREA are vertically aligned than when horizontally aligned.

When the dielectric constant of the liquid crystal molecules 402 that form the sensor capacitor Cs increases, the variation in the capacitance of the sensor capacitor Cs in response to a touch action F is increased, thereby increasing sensing sensitivity. A thickness of a sensor spacer 320 may be further increased to reduce the distance between the lower sensor electrode 182 and the upper sensor electrode 432 and thus to increase sensing sensitivity. However, when the dielectric anisotropy of the liquid crystal molecules 402 is used as in the illustrated embodiment, sensing sensitivity can be further increased without further increasing the thickness of the sensor spacer 320.

Figure 13:
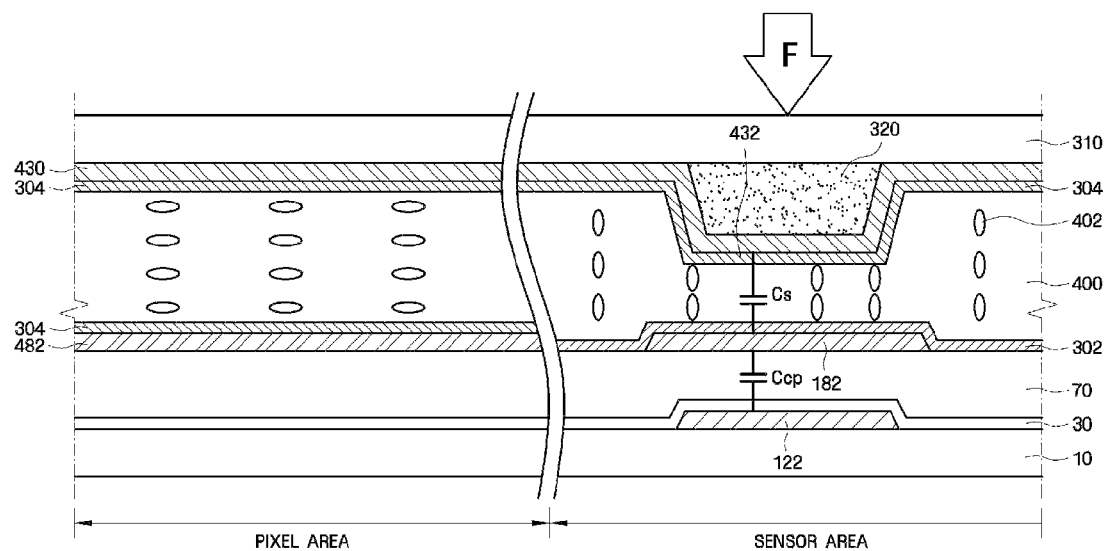
FIG. 13 is a cross-sectional view of a touch screen display apparatus according to a fifth exemplary embodiment of the present invention.

Hereinafter, a touch screen display apparatus according to a fifth exemplary embodiment of the present invention will be described in detail with reference to FIG. 13. FIG. 13 is a cross-sectional view of the touch screen display apparatus according to the fifth exemplary embodiment of the present invention. For simplicity, elements substantially identical to those shown in the drawings for the fourth exemplary embodiment are indicated by like reference numerals, and thus their description will be omitted. Hence, the difference between the present and previous embodiments will mainly be described.

Referring to FIG. 13, a second alignment layer 304, which is a horizontal alignment layer, is disposed on an upper sensor electrode 432 in a sensor area SENSOR AREA. Thus, the initial alignment of liquid crystal molecules 402 in the sensor area SENSOR AREA is determined by the second alignment layer 304, which is a horizontal alignment layer, and a first alignment layer 302 which is a vertical alignment layer. In this case, at least a portion of the liquid crystal molecules 402 is vertically aligned by the first alignment layer 302 on a lower sensor electrode 182. The dielectric constant of the capacitance of a sensor capacitor Cs may be greater than when all of the liquid crystal molecules 402 in the sensor area SENSOR AREA are horizontally aligned. As a result, sensing sensitivity can be advantageously increased.

Figure 14:
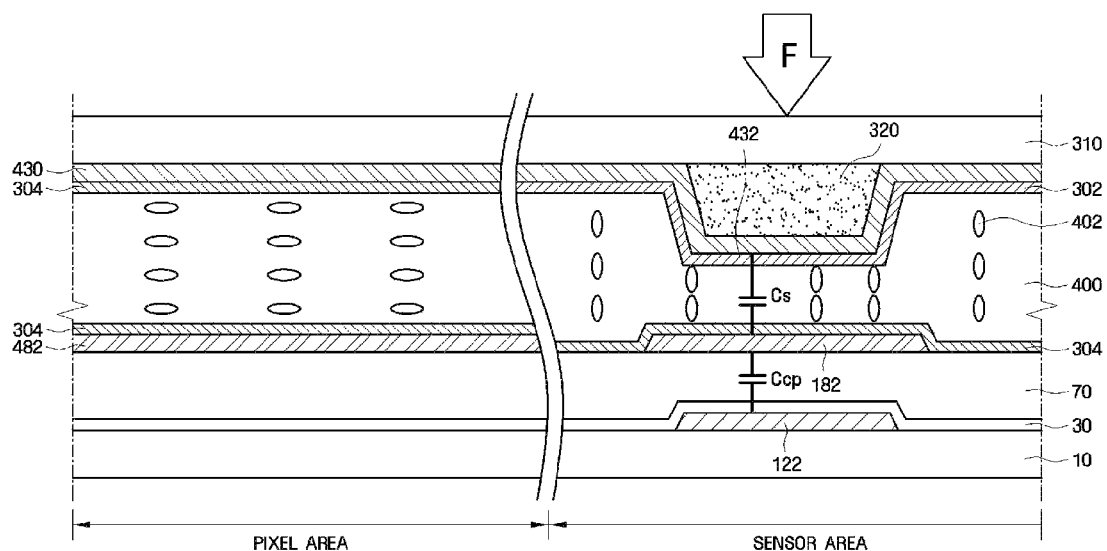
FIG. 14 is a cross-sectional view of a touch screen display apparatus according to a sixth exemplary embodiment of the present invention.

Hereinafter, a touch screen display apparatus according to a sixth exemplary embodiment of the present invention will be described in detail with reference to FIG. 14. FIG. 14 is a cross-sectional view of the touch screen display apparatus according to the sixth exemplary embodiment of the present invention. For simplicity, elements substantially identical to those shown in the drawings for the fourth exemplary embodiment are indicated by like reference numerals, and thus their description will be omitted. Hence, the difference between the present and previous embodiments will mainly be described.

Referring to FIG. 14, a second alignment layer 304, which is a horizontal alignment layer, is disposed on a lower sensor electrode 182 in a sensor area SENSOR AREA. Thus, the initial alignment of liquid crystal molecules 402 in the sensor area SENSOR AREA is determined by the second alignment layer 304, which is a horizontal alignment layer, and a first alignment layer 302 which is a vertical alignment layer. At least a portion of the liquid crystal molecules 402 are vertically aligned by the first alignment layer 302 on an upper sensor electrode 432. The dielectric constant of the capacitance of a sensor capacitor Cs may be greater than when all of the liquid crystal molecules 402 in the sensor area SENSOR AREA are horizontally aligned. As a result, sensing sensitivity can be advantageously increased.

Figure 15:
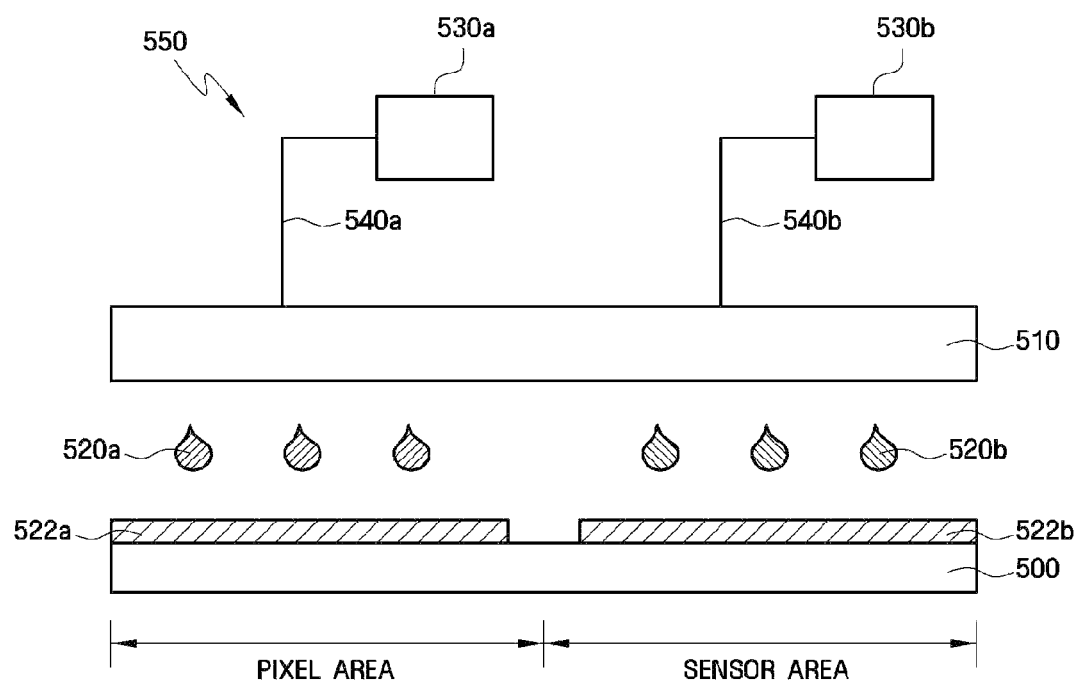
FIG. 15 is a schematic diagram showing an apparatus for forming an alignment layer of a touch screen display apparatus according to a seventh exemplary embodiment of the present invention.

Hereinafter, a method of manufacturing a touch screen display apparatus according to a seventh exemplary embodiment of the present invention will be described in detail with reference to FIG. 15. FIG. 15 is a schematic diagram showing an apparatus 550 for forming an alignment layer of the touch screen display apparatus according to the seventh exemplary embodiment of the present invention.

Referring to FIG. 15, the apparatus 550 using an inkjet printing method includes an inkjet head unit 510 which includes a plurality of nozzles (not shown), a first alignment solution supply unit 530a which stores a first alignment solution 520a, a second alignment solution supply unit 530b which stores a second alignment solution 520b, and supply tubes 540a and 540b which connect the first and second alignment solution supply units 530a and 530b to the inkjet head unit 510 and deliver alignment solution to the inkjet head unit 510, respectively.

A substrate 500 is placed on a stage (not shown) and moves relative to the inkjet head unit 510 as the stage moves.

The inkjet head unit 510 receives the first alignment solution 520a from the first alignment solution supply unit 530a and receives the second alignment solution 520b from the second alignment solution supply unit 530b. The inkjet head unit 510 includes a plurality of nozzles and drops the first alignment solution 520a onto a first portion of the substrate 500, which corresponds to a pixel area PIXEL AREA, to form a first alignment layer 522a and drops the second alignment solution 520b onto a second portion of the substrate 500, which corresponds to a sensor area SENSOR AREA, to form a second alignment layer 522b.

The first and second alignment layers 522a and 522b have different alignment characteristics. In one exemplary, when the first alignment layer 522a is a vertical alignment layer, the second alignment layer 522b is a horizontal alignment layer. Alternatively, when the first alignment layer 522a is a horizontal alignment layer, the second alignment layer 522b is a vertical alignment layer.

As described above, the first and second alignment layers 522a and 522b having different alignment characteristics, can be formed on one substrate 500 by using the inkjet head unit 510. In the illustrated embodiment, the first and second alignment layers 522a and 522b are simultaneously formed in a single process. However, the present invention is not limited thereto. Alternatively, the first alignment layer 522a may be formed before or after the second alignment layer 522b.

Hereinafter, a method of manufacturing a touch screen display apparatus according to an eighth exemplary embodiment of the present invention will be described in detail with reference to FIGS. 16a through 16d. FIGS. 16a through 16d are cross-sectional views showing the process of forming an alignment layer of the touch screen display apparatus according to the eighth exemplary embodiment of the present invention.

In the illustrated embodiment, first and second alignment layers 612 and 622 having different alignment characteristics are formed on a substrate 500 by soft lithography. Soft lithography is a method of forming a certain pattern by using soft material ink, and may include micro contact printing, nano imprinting lithography, and dip pen lithography. For ease of description, a method of forming an alignment layer by using contact printing will be described in the illustrated embodiment.

Figure 16A:
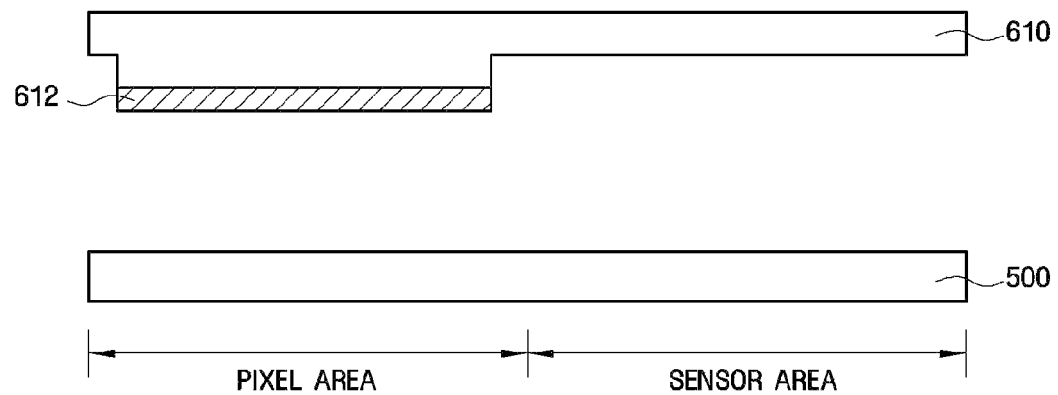
FIGS. 16a through 16d are cross-sectional views showing the process of forming an alignment layer of a touch screen display apparatus according to an eighth exemplary embodiment of the present invention.

Referring to FIG. 16a, an embossed portion of a first mold 610, which corresponds to a pixel area PIXEL AREA, is inked with a first alignment layer 612. The first mold 610 may include elastomer such as polydimethylsiloxane ("PMDS"). When the first mold 610 is made of elastomer, it is weakly adhered to the first alignment layer 612. Thus, the first alignment layer 612 can be easily transferred onto the substrate 500. In addition, since elastomer is durable, the first mold 610 can be used many times.

Figure 16B:
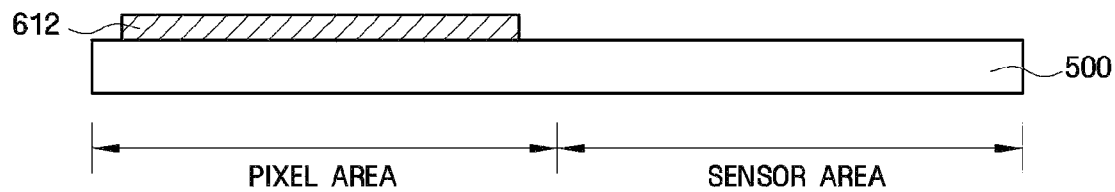

Referring to FIG. 16b, the first alignment layer 612 coated on the embossed portion of the first mold 610 is transferred onto the pixel area PIXEL AREA of the substrate 500.

Figure 16C:
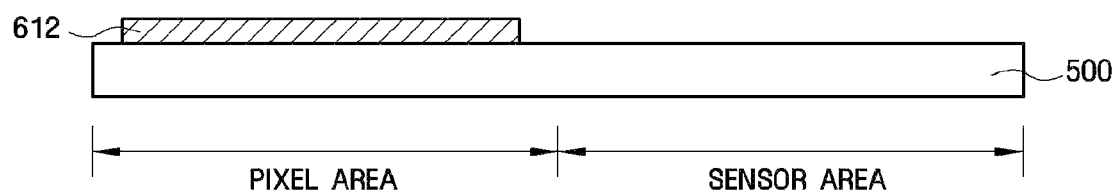

Referring to FIG. 16c, an embossed portion of a second mold 620, which corresponds to a sensor area SENSOR AREA, is inked with a second alignment layer 622. The second mold 620 may include substantially the same material as the first mold 610.

Figure 16D:
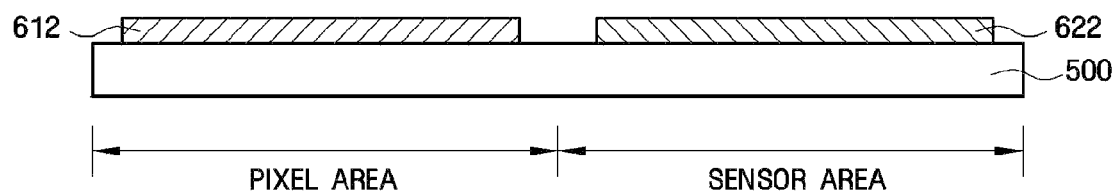

Referring to FIG. 16*d*, the second alignment layer 622 coated on the embossed portion of the second mold 620 is transferred to the sensor area SENSOR AREA of the substrate 500.

The first and second alignment layers 612 and 622 have different alignment characteristics. In one exemplary embodiment, when the first alignment layer 612 is a vertical alignment layer, the second alignment layer 622 is a horizontal alignment layer. Alternatively, when the first alignment layer 612 is a horizontal alignment layer, the second alignment layer 622 is a vertical alignment layer.

In the illustrated embodiment, the first alignment layer 612 is formed before the second alignment layer 622. However, the present invention is not limited to this order.

While the present invention has been particularly shown and described with reference to exemplary embodiments thereof, it will be understood by those of ordinary skill in the art that various changes in form and detail may be made therein without departing from the spirit and scope of the present invention as defined by the following claims. The exemplary embodiments should be considered in a descriptive sense only and not for purposes of limitation.

What is claimed is:

1. A touch screen display apparatus comprising:
    a first substrate;
    a pixel electrode and a lower sensor electrode which are each disposed on the first substrate;
    a second substrate which faces the first substrate;
    a common electrode which is disposed on the second substrate and overlaps the pixel electrode;
    an upper sensor electrode which is disposed on the second substrate and faces the lower sensor electrode;
    a liquid crystal layer which comprises liquid crystal molecules interposed between the first substrate and the second substrate;
    a first alignment layer which is disposed on the pixel electrode and the common electrode;
    a second alignment layer which is disposed on the lower sensor electrode; and
    a third alignment layer which is disposed on the upper sensor electrode,
    wherein
        at least one of the second and third alignment layers aligns the liquid crystal molecules in a different direction from a direction in which the first alignment layer aligns the liquid crystal molecules,
        when touch pressure is applied onto a point on the first or second substrate, a distance between the lower sensor electrode and the upper sensor electrode at the point is changed, and
        a position of the point is detected by using a change in capacitance between the lower sensor electrode and the upper sensor electrode according to the change in the distance between the lower sensor electrode and the upper sensor electrode.

2. The touch screen display apparatus of claim 1, wherein a dielectric constant of liquid crystal molecules between the lower sensor electrode and the upper sensor electrode is greater than a dielectric constant of liquid crystal molecules between the pixel electrode and the common electrode.

3. The touch screen display apparatus of claim 1, wherein the first alignment layer is a vertical alignment layer, and at least one of the second and third alignment layers is a horizontal alignment layer.

4. The touch screen display apparatus of claim 3, wherein the liquid crystal molecules have negative dielectric anisotropy.

5. The touch screen display apparatus of claim 4, wherein the second alignment layer and the third alignment layer are horizontal alignment layers.

6. The touch screen display apparatus of claim 1, wherein the first alignment layer is a horizontal alignment layer, and at least one of the second and third alignment layers is a vertical alignment layer.

7. The touch screen display apparatus of claim 6, wherein the liquid crystal molecules have positive dielectric anisotropy.

8. The touch screen display apparatus of claim 7, wherein the second alignment layer and the third alignment layer are vertical alignment layers.

9. The touch screen display apparatus of claim 1, wherein when no electric field is applied between the pixel electrode and the common electrode, a first alignment direction of the liquid crystal molecules between the pixel electrode and the common electrode is different from a second alignment direction of the liquid crystal molecules between the lower sensor electrode and the upper sensor electrode.

10. The touch screen display apparatus of claim 9, wherein the first alignment direction is perpendicular to the second alignment direction.

11. The touch screen display apparatus of claim 1, further comprising:
    power supply wiring and output wiring which are disposed on the first substrate and extend in a first direction;
    a gate line which is disposed on the first substrate and extends in a second direction inclined with respect to the first direction; and
    a sensor switching element which is turned on in response to a gate-on voltage applied to a previous gate line of the gate line, and delivers a sensing voltage to the output wiring from the power supply wiring.

12. The touch screen display apparatus of claim 11, further comprising:
    a coupling capacitor which is interposed between the previous gate line and a sensor gate electrode of the sensor switching element; and
    a sensor capacitor which is connected to the sensor gate electrode and includes the lower sensor electrode and the upper sensor electrode as two terminals thereof.

13. The touch screen display apparatus of claim 12, wherein the sensor switching element changes a size of the sensing voltage, which is output to the output wiring, according to a change in the capacitance of the sensor capacitor.

14. The touch screen display apparatus of claim 11, further comprising:
    refresh wiring which is disposed, extends in the first direction, and delivers a refresh voltage; and
    a refresh switching device which is turned on in response to a gate-on voltage applied to the gate line and provides the refresh voltage to the sensor switching element.

15. The touch screen display apparatus of claim 14, wherein the refresh switching device comprises:
    a refresh source electrode which is electrically connected to the refresh wiring;
    a refresh gate electrode which is electrically connected to the gate line; and
    a refresh drain electrode which is electrically connected to the sensor gate electrode of the sensor switching element.

16. The touch screen display apparatus of claim 1, further comprising a display area and a sensor area, wherein the first substrate and the second substrate are each continuous and each overlap both the display area and the sensor area.

17. A method of manufacturing a touch screen display apparatus, the method comprising:

forming a first alignment layer and a second alignment layer on a pixel area and a sensor area of a first substrate, respectively;

placing a second substrate to face the first substrate; and interposing a liquid crystal layer, which comprises liquid crystal molecules, between the first substrate and the second substrate;

wherein the first alignment layer aligns the liquid crystal molecules in a different direction from a direction in which the second alignment layer aligns the liquid crystal molecules, when touch pressure is applied onto a point on the first or second substrate, a distance between the first and second substrates in the sensor area is changed, and a position of the point is detected by using a change in capacitance of the liquid crystal molecules according to the change in the distance between the first and second substrates in the sensor area.

18. The method of claim 17, wherein the first alignment layer is one of a vertical alignment layer and a horizontal alignment layer, and the second alignment layer is the other one of the vertical alignment layer and the horizontal alignment layer.

19. The method of claim 17, wherein, the forming a first alignment layer and a second alignment layer comprises substantially simultaneously forming the first and second alignment layers by an inkjet printing method.

20. The method of claim 17, wherein the forming a first alignment layer and a second alignment layer comprises:

coating the first alignment layer on a first embossed portion of a first mold which corresponds to the pixel area;

transferring the first alignment layer, which is coated on the first embossed portion of the first mold, to the first substrate;

coating the second alignment layer on a second embossed portion of a second mold which corresponds to the sensor area; and transferring the second alignment layer, which is coated on the second embossed portion of the second mold, to the first substrate.

* * * * *